(12) United States Patent
Thompson et al.

(10) Patent No.: US 11,919,233 B2
(45) Date of Patent: Mar. 5, 2024

(54) METHOD OF EDGE PRINTING FOR USE IN ADDITIVE MANUFACTURING PROCESSES

(71) Applicant: General Electric Company, Schenectady, NY (US)

(72) Inventors: Mary Kathryn Thompson, Fairfield Township, OH (US); Arunkumar Natarajan, Mason, OH (US); Kwok Pong Chan, Niskayuna, NY (US); Vadim Bromberg, Niskayuna, NY (US); Xi Yang, Mason, OH (US); Ananda Barua, Glenville, NY (US); William C. Alberts, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/889,852

(22) Filed: Aug. 17, 2022

(65) Prior Publication Data
US 2023/0073194 A1 Mar. 9, 2023

Related U.S. Application Data

(60) Provisional application No. 63/237,589, filed on Aug. 27, 2021.

(51) Int. Cl.
*B29C 64/165* (2017.01)
*B29C 64/209* (2017.01)
(Continued)

(52) U.S. Cl.
CPC .......... *B29C 64/165* (2017.08); *B29C 64/209* (2017.08); *B29C 64/336* (2017.08);
(Continued)

(58) Field of Classification Search
CPC ... B29C 64/165; B29C 64/209; B29C 64/336; B33Y 10/00; B29K 2105/0002;
(Continued)

(56) References Cited

U.S. PATENT DOCUMENTS 4,543,373 A 9/1985 Krawiec et al.
5,640,667 A 6/1997 Freitag et al.
(Continued)

FOREIGN PATENT DOCUMENTS

CN 110126266 A 8/2019
EP 0043395 A1 1/1982
(Continued)

OTHER PUBLICATIONS

Mostafaei Amir et al: "Binder jet 3D printing—Process parameters, materials, properties, modeling, and challenges", Progress in Materials Science., vol. 119, Jun. 15, 2020 (Jun. 15, 2020), p. 100707, XP093015322, GB ISSN: 0079-6425, DOI: 10.1016/j.pmatsci.2020.100707 2.1 Process overview * p. 117, Functionality; figure 4.

(Continued)

*Primary Examiner* — Nahida Sultana
(74) *Attorney, Agent, or Firm* — Dinsmore & Shohl LLP

(57) ABSTRACT

Various embodiments provide a method of additively manufacturing a part including depositing a layer of a powder on a working surface, depositing a binder solution on the layer of the powder at first locations, and depositing a sintering aid solution on the layer of the powder at second locations. The sintering aid solution comprises a sintering aid in a solvent. In various embodiments, the sintering aid enables an increased brown strength as compared to parts containing unbound powder. The method enables binders that provide high green strength to be used at the edges of the part, while also balancing a shortened debind time with an increased brown strength. Embodiments in which binder solution is (Continued)

deposited according to a predetermined pattern at second locations are also described.

18 Claims, 11 Drawing Sheets

(51) Int. Cl.
  *B29C 64/336* (2017.01)
  *B29K 105/00* (2006.01)
  *B33Y 10/00* (2015.01)

(52) U.S. Cl.
  CPC ...... *B33Y 10/00* (2014.12); *B29K 2105/0002* (2013.01); *B29K 2105/0073* (2013.01); *B29K 2995/0082* (2013.01)

(58) Field of Classification Search
  CPC .... B29K 2105/0073; B29K 2995/0082; Y02P 10/25; B22F 3/1021; B22F 10/68; B22F 10/14
  See application file for complete search history.

(56) References Cited

U.S. PATENT DOCUMENTS

| | | | |
|---|---|---|---|
| 6,375,874 B1 | 4/2002 | Russell et al. | |
| 6,508,980 B1 | 1/2003 | Sachs et al. | |
| 6,656,410 B2 * | 12/2003 | Hull | B29C 41/12 |
| | | | 264/234 |
| 7,120,512 B2 | 10/2006 | Kramer et al. | |
| 7,220,380 B2 | 5/2007 | Farr et al. | |
| 7,329,379 B2 | 2/2008 | Boyd et al. | |
| 7,365,129 B2 | 4/2008 | Kramer et al. | |
| 7,381,360 B2 | 6/2008 | Oriakhi et al. | |
| 7,431,879 B2 | 10/2008 | Kasai et al. | |
| 7,550,518 B2 | 6/2009 | Bredt et al. | |
| 7,569,273 B2 | 8/2009 | Bredt et al. | |
| 7,700,020 B2 | 4/2010 | Nielsen et al. | |
| 7,744,205 B2 | 6/2010 | Sarkisian et al. | |
| 7,829,000 B2 | 11/2010 | Farr et al. | |
| 7,880,341 B2 | 2/2011 | Shin | |
| 8,362,148 B2 | 1/2013 | Messe et al. | |
| 8,475,946 B1 | 7/2013 | Dion et al. | |
| 8,845,953 B1 | 9/2014 | Balistreri et al. | |
| 9,216,547 B2 | 12/2015 | Elsey | |
| 9,643,360 B2 | 5/2017 | Kashani-Shirazi | |
| 9,770,867 B2 | 9/2017 | Mgele et al. | |
| 9,790,381 B2 | 10/2017 | Arita et al. | |
| 9,790,388 B2 | 10/2017 | Wang et al. | |
| 9,796,862 B2 | 10/2017 | Morita et al. | |
| 9,873,228 B2 | 1/2018 | Suzuki et al. | |
| 9,908,819 B1 | 3/2018 | Kollenberg | |
| 10,189,204 B2 | 1/2019 | Fulop et al. | |
| 10,232,437 B1 | 3/2019 | Yavari et al. | |
| 10,272,592 B2 | 4/2019 | Demuth et al. | |
| 10,343,301 B2 | 7/2019 | Gnther et al. | |
| 10,392,521 B2 | 8/2019 | Ng et al. | |
| 10,449,692 B2 | 10/2019 | Balistreri et al. | |
| 11,091,660 B2 * | 8/2021 | Nguyen | C08L 63/00 |
| 11,203,706 B1 * | 12/2021 | McArdle | C09K 3/1418 |
| 11,634,592 B2 * | 4/2023 | Koning | C09D 167/04 |
| | | | 525/449 |
| 2001/0001640 A1 | 5/2001 | Miller et al. | |
| 2006/0267252 A1 | 11/2006 | Steinmann et al. | |
| 2015/0344682 A1 | 12/2015 | Ganapathiappan et al. | |
| 2016/0236412 A1 | 8/2016 | Kusahara et al. | |
| 2016/0257070 A1 | 9/2016 | Boydston et al. | |
| 2016/0257843 A1 | 9/2016 | Boydston et al. | |
| 2017/0226360 A1 | 8/2017 | Chen et al. | |
| 2017/0297100 A1 | 10/2017 | Gibson et al. | |
| 2017/0297106 A1 | 10/2017 | Myerberg et al. | |
| 2018/0009157 A1 | 1/2018 | Gutierrez et al. | |
| 2018/0236543 A1 | 8/2018 | Hart et al. | |
| 2018/0236544 A1 | 8/2018 | Benn et al. | |
| 2018/0236545 A1 | 8/2018 | Trump et al. | |
| 2018/0237648 A1 | 8/2018 | Barbati et al. | |
| 2018/0248191 A1 | 8/2018 | Liu et al. | |
| 2018/0311728 A1 | 11/2018 | Kottilingam et al. | |
| 2019/0010091 A1 | 1/2019 | Nordahl | |
| 2019/0039121 A1 | 2/2019 | Bodinger et al. | |
| 2019/0054527 A1 | 2/2019 | Natarajan et al. | |
| 2019/0127517 A1 | 5/2019 | Vidavsky et al. | |
| 2019/0134895 A1 | 5/2019 | Abbott, Jr. et al. | |
| 2019/0168297 A1 | 6/2019 | Xiao | |
| 2019/0248932 A1 | 8/2019 | Korshikov et al. | |
| 2019/0337053 A1 | 11/2019 | Moosberg et al. | |
| 2021/0053116 A1 | 2/2021 | Seleznev et al. | |
| 2021/0371619 A1 | 12/2021 | Natarajan et al. | |

FOREIGN PATENT DOCUMENTS

| | | |
|---|---|---|
| EP | 0354376 A1 | 2/1990 |
| JP | 2005171299 A | 6/2005 |
| WO | 02078907 A2 | 10/2002 |
| WO | 2017146711 A1 | 8/2017 |
| WO | 2018020331 A1 | 2/2018 |
| WO | 2019147265 A1 | 8/2019 |
| WO | 2019157074 A2 | 8/2019 |
| WO | 2019213596 A1 | 11/2019 |
| WO | 2019213602 | 11/2019 |
| WO | 2019221999 A1 | 11/2019 |
| WO | 2020099241 A1 | 5/2020 |

OTHER PUBLICATIONS

Extended European Search Report for Application No. 22187824.2 dated Feb. 5, 2023 (11 pages).

Lee, et al., "A Study on Reduction of Processing Time and Improvement of Strength by using Photopolymer Resin in the 3DP Process, Key Engineering Materials", Dec. 1, 2006, ISSN: 1662-9795, vols. 326-328, pp. 151-154 doi:10.4028/www.scientific.net/KEM.326-328.151 © 2006 Trans Tech Publications, Switzerland.

Murakami, et al., (2006) "Positive direct-mask stereolithography with multiple-layer exposure: layered fabrication with stair step reduction", Virtual and Physical Prototyping, 1:2, 73-81, DOI: 10.1080/17452750600649492.

Frykholm, et al., "Solid State Sintered 3-D Printing Component by Using Inkjet (Binder) Method", Jan. 14, 2016, 6 pages, Tokyo 107-0052 Japan.

Grant, et al., "Mitigating Distortion During Sintering of Binder Jet Printed Ceramics", Solid Freeform Fabrication 2018: Proceedings of the 29th Annual International Solid Freeform Fabrication Symposium—An Additive Manufacturing Conference, 8 pages.

LV, et al., "Binder jetting of ceramics: Powders, binders, printing parameters, equipment, and post-treatment", Ceramics International, Apr. 6, 2019, 17 pages.

Kruft, Jr., Jonathan G., Thesis entitled "Pressureless Sintering of Powder Processed Graded Metal-Ceramic Composites Using a Nanoparticle Sintering Aid and Bulk Molding Technology", Master of Science, 2007, 138 pages.

* cited by examiner

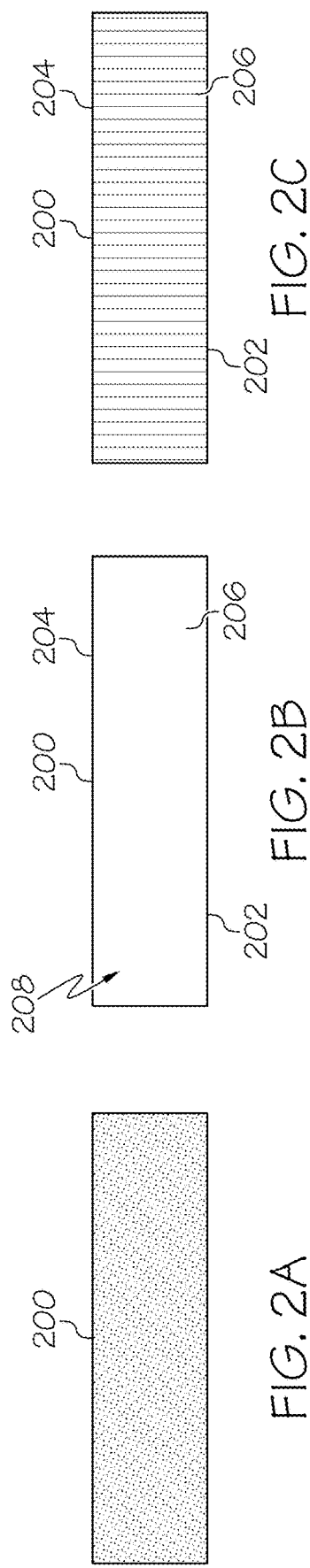

METHOD OF EDGE PRINTING FOR USE IN ADDITIVE MANUFACTURING PROCESSES

CROSS-REFERENCE TO RELATED APPLICATIONS

The present specification claims the benefit of U.S. Provisional Application Ser. No. 63/237,589 filed Aug. 27, 2021 and entitled "Method of Edge Printing For Use in Additive Manufacturing," the entirety of which is incorporated by reference herein.

FIELD

This disclosure relates to additive manufacturing and, more particularly, to depositing binders for use in additive manufacturing processes.

TECHNICAL BACKGROUND

Additive manufacturing, also known as 3D printing, is a process in which material is built up layer by layer to form a three-dimensional part. Binder jetting is an additive manufacturing technique based on the use of a binder to join particles of a powder to form a three-dimensional part. In particular, the binder is jetted from a print head onto successive layers of the powder in a build volume, where layers of the powder and the binder adhere to one another to form a green body part. In some applications, the green body part is suitable for end-use. In other applications, subsequent processing, such as removal of the binder and sintering of the powder, may be needed to transform the green body part into a finished, three-dimensional part.

Conventional binder jetting processes deposit binder at each location at which the powder will eventually be sintered in order to bind the powder and provide green strength to the part. However, the manufacture of very thick or large parts can require large amounts of binder, which can, in turn, raise the cost of manufacture. Additionally, the removal of the binder (e.g., debinding) from thick or non-uniform cross sections can lead to cracking and/or increased porosity of the final part.

Accordingly, the need exists for alternative methods of manufacturing three-dimensional parts that reduce the amount of binder applied to parts while maintaining properties of the green and brown body parts.

SUMMARY

Various embodiments disclosed herein meet these needs by providing methods in which a binder solution is deposited on a layer of powder at less than all locations at which powder is sintered to form a final part. In various embodiments, the binder solution is deposited at locations corresponding to an edge boundary of the part to define the geometry of the part and form a shell of the part. Depending on the particular embodiment, a sintering aid solution may be deposited on the powder, or the powder may remain unbound, but contained within the geometry of the part defined by locations at which the binder solution is deposited on the powder. Accordingly, a reduced amount of binder is deposited within the powder bed as compared to conventional processes.

In various embodiments, a method of additively manufacturing a part includes depositing a layer of a powder on a working surface, depositing a binder solution on the layer of the powder at first locations, and depositing a sintering aid solution on the layer of the powder at second locations. The binder solution comprises greater than or equal to 93 wt % and less than or equal to 99.8 wt % of a monomer, greater than or equal to 0.1 wt % and less than or equal to 2 wt % of a thermal initiator, and greater than or equal to 0.1 wt % and less than or equal to 3 wt % of at least one of a super acid generating initiator, a photo-thermal initiator, and a photoinitiator. The monomer comprises at least one of a difunctional monomer and a monofunctional monomer. The sintering aid solution comprises a sintering aid in a solvent. In various embodiments, the sintering aid enables an increased brown strength as compared to parts containing unbound powder. The method enables binders that provide high green strength to be used at the edges of the part, while also balancing a shortened debind time (e.g., as a result of the reduced amount of binder within the thickness of the part) with an increased brown strength (e.g., resulting from the sintering aid).

In various embodiments, a method of additively manufacturing a part includes, for each of a plurality of regions of the part, determining a thickness of the part within the region, wherein the thickness of the part within each region comprises a solid wall devoid of cavities between a first surface of the region and a second surface of the region, and the thickness is a distance between the first surface and the second surface; depositing the binder solution within a powder bed corresponding to the first and second surfaces of each of the plurality of regions to bind powder along each of the surfaces, thereby defining a geometry of the part; for at least one of the plurality of regions of the part, depositing binder solution within the powder bed in a predetermined pattern at locations between the first and second surfaces such that at least some powder between the first and second surfaces is unbound; removing loose powder external to the geometry of the part, thereby exposing a green body part having unbound powder contained within the geometry of the part; and sintering the green body part to generate the part, wherein the unbound powder is sintered to solidify the solid wall of the part. The method enables a reduced amount of binder to be used, thereby reducing the debind time as compared to conventional binder jetting methods, while reducing the likelihood that the part will crack during debinding. Additional features and advantages will be described in greater detail below.

According to a first aspect A1, a method of additively manufacturing a part may comprise: depositing a layer of a powder on a working surface; depositing a binder solution on the layer of the powder at first locations, wherein the binder solution comprises: greater than or equal to 93 wt % and less than or equal to 99.8 wt % of a monomer; greater than or equal to 0.1 wt % and less than or equal to 2 wt % of a thermal initiator; and greater than or equal to 0.1 wt % and less than or equal to 3 wt % of at least one of a super acid generating initiator, a photo-thermal initiator, and a photoinitiator; and depositing a sintering aid solution on the layer of the powder at second locations, wherein the sintering aid solution comprises a sintering aid in a solvent.

A second aspect A2 includes the method according to the first aspect A1, wherein the sintering aid comprises a fugitive metal precursor, metallic nanoparticles, ceramic nanoparticles, or combinations thereof.

A third aspect A3 includes the method according to the first aspect A1 or the second aspect A2, wherein he sintering aid solution is substantially free of polymers.

A fourth aspect A4 includes the method according to any one of the first through third aspects A1-A3, wherein the binder solution is deposited with a first print head and the sintering aid solution is deposited with a second print head.

A fifth aspect A5 includes the method according to any one of the first through fourth aspects A1-A4, wherein the first locations correspond to a surface of the part.

A sixth aspect A6 includes the method according to any one of the first through fifth aspects A1-A5, wherein the second locations correspond to a thickness of the part between surfaces of the part.

A seventh aspect A7 includes the method according to any one of the first through sixth aspects A1-A6, wherein depositing the sintering aid solution on the layer comprises selectively depositing the sintering aid solution in a predetermined pattern on the layer.

An eighth aspect A8 includes the method according to any one of the first through seventh aspects A1-A7, wherein depositing the sintering aid solution comprises spraying the sintering aid solution on the layer.

A ninth aspect A9 includes the method according to any one of the first through eighth aspects A1-A8, further comprising: polymerizing the binder solution to form a green body part having a flexural strength greater of greater than or equal to 15 MPa; and depositing a sintering aid solution on the layer of the powder at second locations, wherein the sintering aid solution comprises a sintering aid in a solvent.

A tenth aspect A10 includes the method according to the ninth aspect A9, wherein the green body part has a flexural strength greater of greater than or equal to 20 MPa.

According to an eleventh aspect A11, a method of additively manufacturing a part may comprise: for each of a plurality of regions of the part, determining a thickness of the part within the region, wherein the thickness of the part within each region comprises a solid wall devoid of cavities between a first surface of the region and a second surface of the region, and the thickness is a distance between the first surface and the second surface; depositing the binder solution within a powder bed at locations corresponding to the first surface and the second surface of each of the plurality of regions to bind powder along each of the first surface and the second surface, thereby defining a geometry of the part; for at least one of the plurality of regions of the part, depositing the binder solution within the powder bed in a predetermined pattern at locations between the first surface and the second surface such that at least some powder between the first surface and the second surface is unbound; removing loose powder external to the geometry of the part, thereby exposing a green body part having unbound powder contained within the geometry of the part; and sintering the green body part to generate the part, wherein the unbound powder contained in the green body part is sintered to solidify the solid wall of the part.

A twelfth aspect A12 includes the method according to the eleventh aspect A11, wherein the depositing the binder solution at locations corresponding to the first surface and the second surface of each of the plurality of regions comprises depositing the binder solution at locations effective to bind a layer having a thickness of from 2.5 mm to 4.0 mm for each of the first surface and the second surface of each of the plurality of regions.

A thirteenth aspect A13 includes the method according to the eleventh aspect A11 or the twelfth aspect A12, wherein the predetermined pattern is selected based on processes to which the green body part will be subjected, handling to which the green body part will be subjected, loads to which the green body part will be subjected, or combinations thereof.

A fourteenth aspect A14 includes the method according to any of the eleventh through thirteenth aspects A11-A13, wherein, for at least one of the plurality of regions of the part, no binder solution is deposited at locations between the first surface and the second surface such that the powder between the first surface and the second surface is unbound.

A fifteenth aspect A15 includes the method according to any of the eleventh through fourteenth aspects A11-A14, wherein for at least one of the plurality of regions of the part, depositing the binder solution within the powder bed between the first surface and the second surface to bind powder between the first surface and the second surface such that substantially all of the powder between the first surface and the second surface is bound within the at least one of the plurality of regions, A sixteenth aspect A16 includes the method according to any of the eleventh through fifteenth aspects A11-A15, wherein the predetermined pattern comprises treads extending between the first surface and the second surface.

A seventeenth aspect A17 includes the method according to any one of the eleventh through sixteenth aspects A11-A16, wherein an amount of binder present at a surface of the green body part is greater than an amount of binder present within a thickness of a wall of the green body part.

An eighteenth aspect A18 includes the method according to any one of the eleventh through seventeenth aspects A11-A17, wherein curing the green body part, wherein a time to cure the green body part is less than a time to cure a comparative green body part having a geometry identical to the green body part and in which all powder within the geometry of the part is bound.

Additional features and advantages of the embodiments disclosed herein will be set forth in the detailed description, which follows, and in part will be readily apparent to those skilled in the art from that description or recognized by practicing the disclosed embodiments as described herein, including the detailed description which follows, the claims, as well as the appended drawings.

It is to be understood that both the foregoing general description and the following detailed description present embodiments intended to provide an overview or framework for understanding the nature and character of the claimed embodiments. The accompanying drawings are included to provide further understanding, and are incorporated into and constitute a part of this specification. The drawings illustrate various embodiments of the disclosure, and together with the description serve to explain the principles and operations thereof.

BRIEF DESCRIPTION OF THE DRAWINGS

FIG. 2A is a schematic cross-section of a region of a part fully printed with binder according to one or more embodiments shown and described herein;

FIG. 2B is a schematic cross-section of a region of a part in which unbound powder is contained between surfaces of the part according to one or more embodiments shown and described herein;

FIG. 2C is a schematic cross-section of a region of a part in which binder is deposited according to a predetermined pattern between surfaces of the part according to one or more embodiments shown and described herein;

FIG. 2D is a schematic cross-section of a region of a part in which binder is deposited according to another predetermined pattern between surfaces of the part according to one or more embodiments shown and described herein;

FIG. 2E is a schematic cross-section of a region of a part in which binder is deposited according to another predetermined pattern between surfaces of the part according to one or more embodiments shown and described herein;

DETAILED DESCRIPTION

Figure 1:
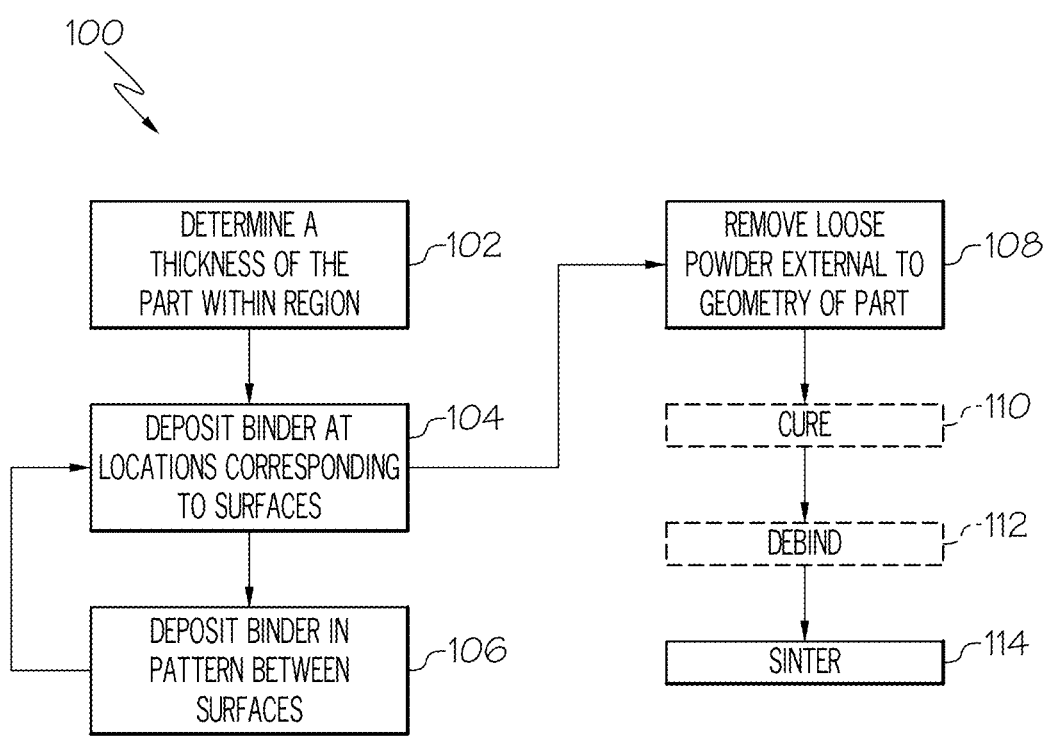
FIG. 1 is a flow diagram of an example method of manufacturing a part via additive manufacturing including depositing binder in a predetermined pattern at locations between surfaces of the part according to one or more embodiments shown and described herein.

Reference will now be made in detail to the present preferred embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, for example by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply ab solute orientation.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the phrases "green body metal part" and "green body part" denote a part that has not undergone heat treatment to remove the chemical binder. As used herein, the phrases "brown body metal part" and "brown body part" denote a part that has undergone heat treatment to remove the chemical binder. As used herein, a "metal part" means a part having metallic materials. While various embodiments are described in the context of metal parts, the binder solutions described herein are applicable to a wide variety of parts, including but not limited to, polymer and ceramic parts.

As used herein, the phrase "water-based" includes mixtures, solutions, suspensions, dispersions and the like that include water as a primary liquid by volume, but may include one or more other liquids. Accordingly, the solvent used for various binder solutions is mostly water. In some embodiments, the water is present at a concentration of at least about 50% of the binder solution by volume and in particular embodiments, the water is present at a concentration of at least about 75% by volume. As used herein, the term "water" includes deionized water, distilled water, and tap water, unless otherwise specified. In embodiments, water is ASTM D1193 type IV water or better.

The phrase "fugitive metal precursor," as used herein, refers to a metal salt or organometallic compound that is decomposed during debinding and/or sintering, which results in metal, metal oxide, metal carbide, or metal nitride formation and the burning out of the organic and inorganic functionalities of the metal salt or organometallic compound.

The term "decompose," as used herein, refers to the reduction of the fugitive metal precursor during debinding and/or sintering to only metal and the burning out of the organic and inorganic functionalities of the fugitive metal precursor.

The term "nanoparticle," as used herein, refers to a particle having a diameter greater than or equal to 1 nm and less than or equal to 100 nm.

The term "average diameter," as used herein, refers to the average diameter of all the nanoparticles included in the binder solution.

The phrase "sintering compaction temperature," as used herein, refers to the temperature at which localized melting starts to occur within the nanoparticles.

The term "debinding," as used herein, refers to heating the green body part above a first temperature such that thermolysis of the thermoplastic/thermoset binders into small oligomers occurs and at least a portion of the binder is removed, thereby forming a brown body part. During debinding, nanoparticle sintering may occur, which may form necked regions of a nanoparticulate material between the particles of the powder layer to impart higher strength to the brown body part.

The term "sintering," as used herein, refers to heating the brown body part above a second temperature to remove a remaining portion of the binder (e.g., oligomeric residue and thermolytic byproducts formed during debinding) and consolidate the particles of the powder layer thereby forming a consolidated part.

The term "necked region," as used herein, refers to local deformation of the nanoparticulate material between adjacent particles of the particulate material.

The parameters "green body strength" and "brown body strength" of the parts, as discussed herein, are measured using a three-point flexural strength test in accordance with ASTM B312-14.

The phrase "weak non-covalent forces," as used herein, refers to hydrogen bonding, ionic bonding, Van der Waals forces, and the like having a bond or force strength greater than or equal to 1 kcal/mol and less than or equal to 7 kcal/mol.

The phrases "standard temperature and pressure" and "STP," as used herein, refer to a temperature of 0° C. and pressure of 101.325 kPa.

The phrase "neat binder," as used herein, refers to a binder that does not include a solvent.

The phrase "thermoplastic polymer," as used herein, refers to a polymer having one or more polymer strands having functional groups that may interact with one another via weak non-covalent forces (e.g., interactions, bonds) to link, or otherwise couple, strands of each respective thermoplastic polymer to one another.

The phrase "thermal initiator," as used herein, refers to a compound that creates reactive species (i.e., free radicals, cations, or anions) upon exposure to heat.

The phrase "photoinitiator," as used herein, refers to a compound that creates reactive species (i.e., free radicals, cations, or anions) upon exposure to radiation (e.g., UV).

The phrase a "photo-thermal initiator," as used herein, refers to a compound or a mixture of compounds that creates reactive species (i.e., free radicals, cations, or anions) upon exposure to radiation (e.g., UV) and/or thermal (heat) and releases heat due to exothermic crosslinking of reactive monomers, which creates further reactive species and induces further crosslinking in the depth of layers.

The phrase "super acid generating initiator," as used herein, refers to a thermally or photochemically decomposable initiator that may produce a "super acid." A "super acid" refers to an acid with an acidity greater than that of 100% pure sulfuric acid, which has a Hammit acidity function ($H_0$) of −12.

The phrase "secondary initiator," as used herein, refers to at least one of a super acid generating initiator, a photo-thermal initiator, and a photoinitator.

Conventional binder jetting processes deposit binder at each location at which the powder will eventually be sintered in order to bind the powder and provide green strength to the part. However, the removal of the binder (e.g., debinding) from thick or non-uniform cross sections can lead to cracking and/or increased porosity of the final part. Accordingly, various embodiments described herein provide methods in which a binder solution is deposited on a powder layer at locations corresponding to an edge boundary of a final part, but less than all locations at which powder is sintered to form the final part. Depending on the particular embodiment, a sintering aid solution may be deposited on the powder layer, or the powder may remain unbound but contained within a geometry of the part defined by the edge boundary. Thus, a reduced amount of binder is deposited within the powder bed as compared to conventional processes.

Various embodiments described herein provide methods of additively manufacturing a part including depositing a layer of a powder on a working surface, depositing a binder solution on the layer of the powder at first locations corresponding to an edge boundary of the part, and depositing a sintering aid solution on the layer of the powder at second locations. The binder solution comprises greater than or equal to 93 wt % and less than or equal to 99.8 wt % of a monomer, greater than or equal to 0.1 wt % and less than or equal to 2 wt % of a thermal initiator, and greater than or equal to 0.1 wt % and less than or equal to 3 wt % of at least one of a super acid generating initiator, a photo-thermal initiator, and a photoinitiator. The monomer comprises at least one of a difunctional monomer and a monofunctional monomer. The sintering aid solution comprises a sintering aid in a solvent. The sintering aid enables increased brown strength of a brown body part formed after the binder is removed through a debinding process. Accordingly, the method enables binders that provide high green strength to be used, while also balancing a shortened debind time with an increased brown strength. These and additional advantages will be described in greater detail below.

Moreover, various embodiments described herein provide a method of additively manufacturing a part including, for each of a plurality of regions of the part, determining a thickness of the part within the region; depositing the binder solution within a powder bed corresponding to first and second surfaces of each of the plurality of regions to bind powder along each of the surfaces, thereby forming an edge boundary defining a geometry of the part; for at least one of the plurality of regions of the part, depositing binder solution within the powder bed in a predetermined pattern at locations between the first and second surfaces such that at least some powder between the first and second surfaces is unbound; removing loose powder external to the geometry of the part, thereby exposing a green body part having unbound powder contained within the geometry of the part; and sintering the green body part to generate the part, wherein the unbound powder is sintered to solidify a solid wall of the part. The method enables a reduced amount of binder to be used, thereby reducing the debind time as compared to conventional binder jetting methods, while reducing the likelihood that the part will crack during debinding. These and additional advantages will be described in greater detail below.

Methods

Referring now to FIG. 1, a method 100 of additively manufacturing a part in which a binder solution is deposited on a layer of powder at less than all locations at which powder is sintered to form a final part is shown. To facilitate discussion of aspects of the method 100, reference is made to FIG. 3, which is a block diagram depicting an embodiment of an additive manufacturing apparatus 30 that can be used to perform method 100. In the method 100, the part to be printed is first analyzed by a control system 42.

In various embodiments, the control system 42 of the additive manufacturing apparatus 30 may include a distributed control system or any suitable device employing a general purpose computer or application-specific device. The control system 42 generally includes memory 44 storing one or more instructions for analyzing a computer model corresponding to the part to be printed and controlling operation of the print head 38. In embodiments, the memory 44 stores CAD designs representative of a structure of the part being manufactured. In embodiments, the CAD design may not exactly match the geometry of the final desired part. Additionally, the control system 42 includes at least one processor 46 (e.g., microprocessor), and the memory 44 may include one or more tangible, non-transitory, machine-readable media collectively storing instructions executable by the processor 46 to control actions described herein.

Figure 2F:
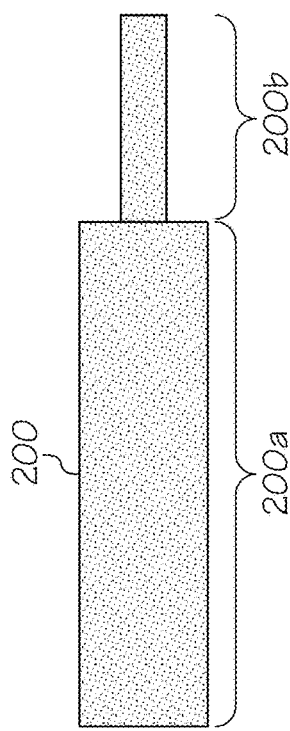
FIG. 2F is a schematic cross-section of a part having two regions each fully printed with binder according to one or more embodiments shown and described herein.

In embodiments, the control system 42 uses software to analyze a computer model (e.g., CAD design) corresponding to the part and divides the computer model into a plurality of regions. Each region includes a solid wall devoid of cavities between a first surface of the region and a second surface of the region, as shown in FIGS. 2A and 2F. The number of regions into which the computer model is divided varies depending on the part, and, in embodiments, each region can be defined by a change in geometry of the part. Regions may also be defined, for example, around apertures, such that each region is devoid of cavities. For example, where the part includes an aperture, a first region may be to the left of the aperture, and a second region may be to the right of the aperture, or a first region may be above the aperture, and a second region may be below the aperture.

As shown in FIG. 2F, the part 200 is divided into a first region 200a and a second region 200b. For simplicity, FIGS. 2A-2E depict only a single region of a part 200, and it should be appreciated that other regions of the part 200 are not shown. However, it should be appreciated that a part can be divided into any number of regions, such as two or three or more regions, depending on the specific geometry of the part. Other methods of dividing the computer model into a plurality of regions are contemplated and possible.

As depicted in FIG. 1, the method 100 begins with determining a thickness of the part to be printed for each of a plurality of regions of the part (block 102). As described above and illustrated in FIGS. 2B-2H, the thickness 206 of the part in each region refers to a thickness of a solid wall devoid of cavities between a first surface 202 of the region and a second surface 204 of the region, with the thickness 206 being the distance between the first surface 202 and the second surface 204. Based on the thickness of each region, the control system 42 determines how binder solution will be applied for each layer of the part. In various embodiments, the control system 42 identifies regions in which the thickness exceeds a threshold thickness and should not be printed in the conventional manner. For example, a threshold thickness can be a maximum thickness in the region of greater than about 5 millimeters (mm), greater than about 10 mm, greater than about 15 mm, greater than about 20 mm, or greater than about 25 mm. Other threshold values are possible and contemplated, and can vary depending on the particular binder solution and throughput requirements of the system. Accordingly, for regions in which the maximum thickness is less than the threshold thickness, the region may be printed in a conventional manner in which binder solution is deposited on a powder layer to bind the powder layer by layer. However, for regions in which the maximum thickness is greater than or equal to the threshold thickness, the binder solution can be deposited at less than all locations corresponding to the final part.

Figure 3:
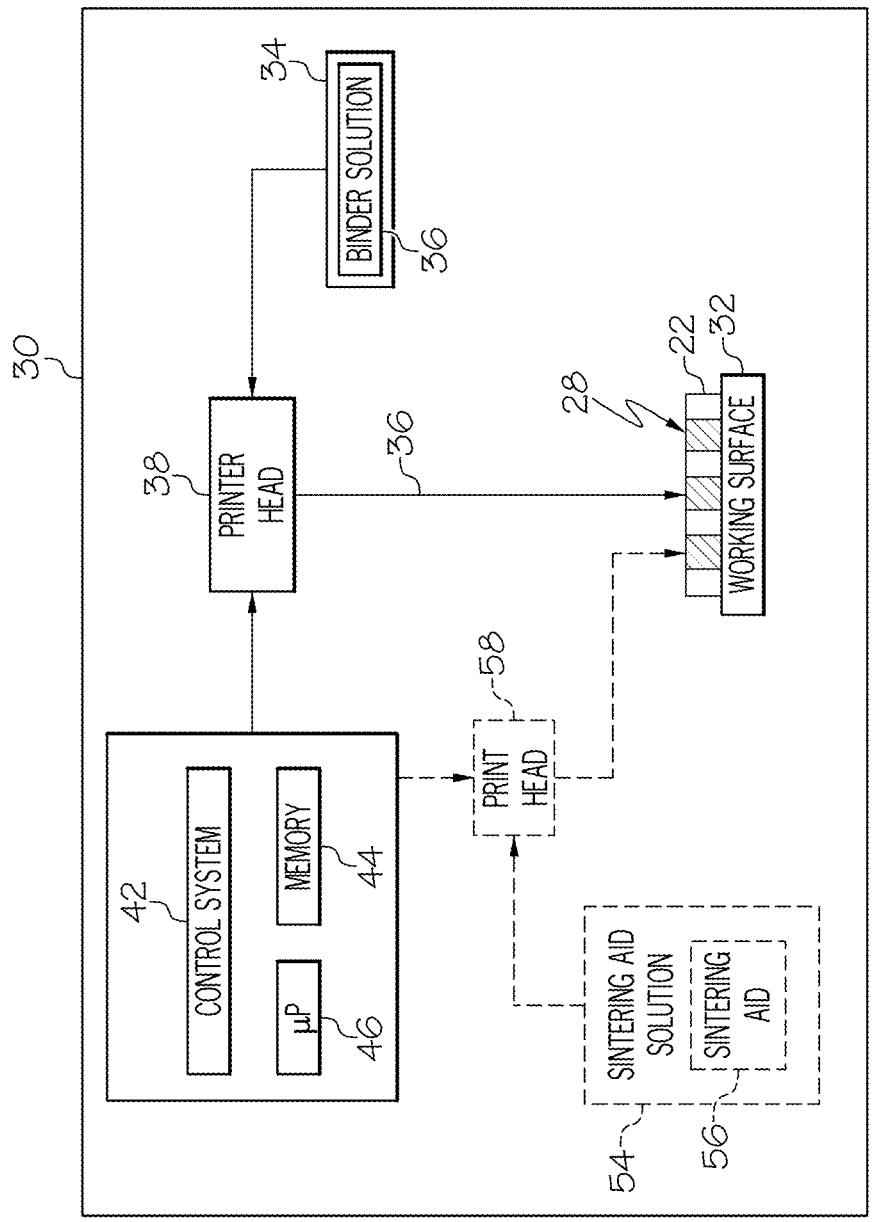
FIG. 3 is a block diagram of an embodiment of an additive manufacturing apparatus used to manufacture the part in accordance with the method of FIG. 1.

Building of the part begins by depositing a layer of a powder material 22 that is used to manufacture the part (not shown in FIG. 1). In various embodiments, the layer of the powder material 22 is deposited on a working surface 32 of the additive manufacturing apparatus, as shown in FIG. 3. The powder material can be a metal powder, such as a nickel alloy, cobalt alloy, cobalt-chromium alloy, cast alloy, titanium alloy, aluminum-based materials, tungsten, stainless steel, or the like. Other powder materials may be used depending on the particular embodiment.

Next, the method 100 continues with selectively depositing a binder solution 36 into the layer of powder material 22 in a pattern representative of a structure of the part at locations corresponding to the first surface 202 (block 104). The binder solution 36 can be, for example, any one of various embodiments of the binder solution described herein. In various embodiments, the binder solution 36 is selectively printed using a print head 38 that is operated by the control system 42 based on the computer model that includes a representation of the layer of the part being printed.

After the binder solution 36 is selectively deposited into the layer of powder material 22, the binder in the binder solution 36 at least partially coats an outer surface of powder particles, thereby generating binder-coated particles 28. As will be described, the binder bonds the binder-coated particles 28 according to the pattern of the binder solution 36 printed into the layer of powder material 22 to form a layer of the green body part.

The method 100 may repeat the steps of depositing a layer of powder material (not shown) and selectively depositing the binder solution 36 into the layer of powder material to continue building up the part in a layer-by-layer manner until a desired number of layers have been printed along the first surface 202 to form an edge boundary of the part, which can be thought of as a shell of the part, for example. As used herein, the terms "edge boundary" or "edge" refer to the boundary of the first surface 202, and has an associated thickness. Accordingly, the edge of the part is formed according to conventional additive manufacturing techniques. In embodiments, one or more layers may be printed to bind powder material along the first surface 202. The binder of the binder solution 36 bonds each successive layer and provides a certain degree of strength (e.g., green body strength) to the green body part such that the integrity of the structure of the green body part is maintained during post-printing processes (e.g., transferring, inspecting, and/or depowdering). That is, the green body strength provided by the binder of the binder solution 36 maintains bonding between the particles of the powder material 22 within the layers and blocks (e.g., resists and/or prevents) delamination of the layers during handling and post-printing processing of the green body part. Accordingly, the thickness of the edge (e.g., the number of layers printed to form the first surface 202) may vary depending the cross-section of the region, the size of the part, the expected green and/or brown strength, and the expected distortion during sintering. In various embodiments, the thickness of the edge is a determination made by the control system 42 based on a balancing of these factors. For example, for a very large part, the distortion expected to result from burning out a large quantity of binder may result in a thinner edge than may be most desirable to support the weight of the green body part and brown body part. As another example, for a part that will be moved while in the green body and/or brown body state, the need for increased green and/or brown strength may result in a thicker edge than could otherwise be tolerated by a small part. In embodiments, the edge is a continuous layer of bound powder having a thickness of from 2.5 mm to 4.0 mm.

Next, the method 100 may repeat the steps of depositing a layer of powder material (not shown), followed by selectively depositing the binder solution 36 into the layer of powder material in a predetermined pattern at locations between the first surface 202 and the second surface 204 for at least one of the plurality of regions of the part (e.g., regions having a maximum thickness greater than or equal to the threshold thickness) (block 106). Accordingly, in areas that will be contained within or bound by the surfaces 202, 204 of the part (e.g., areas that form the bulk of the thickness 206 of the walls of the part and will be contained within the shell formed by the edges of the part), the binder solution 36 is deposited in a predetermined pattern. As used herein, the phrase "predetermined pattern" refers to a deposition pattern in which binder is deposited at less than all locations between the first surface 202 and the second surface 204.

Although not explicitly discussed herein, it should be appreciated that side edges connecting the first surface 202 and the second surface 204 are printed in a manner similar to the first surface 202 described above, and may be printed before or in conjunction with block 106. Accordingly, in embodiments, the predetermined pattern can include depositing binder solution 36 to bind powder and form the side edge before and after depositing the binder solution 36 according to the pattern.

As set forth above, in various embodiments, the predetermined pattern in which the binder solution 36 is deposited is selected based at least in part on the thickness of the corresponding region, processes to which the green body part will be subjected, handling to which the green body part will be subjected, loads to which the green body part will be subjected, or combinations thereof. Some example patterns are illustrated in FIGS. 2C-2E. For example, in FIGS. 2C and 2E, the binder solution 36 can be deposited to form lines of bound powder extending through the thickness 206 of the part 200, from the first surface 202 to the second surface 204, connecting the first surface 202 to the second surface 204. Such patterns can provide additional support for load handling, for example. Alternatively, as shown in FIG. 2D, the binder solution 36 can be deposited to form areas of bound powder at various locations within the thickness 206 of the part without connecting the first surface 202 to the second surface 204. It should be appreciated that other internal features of the wall of the green body part, such as ribs and the like, can be printed by depositing binder solution 36 according to a predetermined pattern to provide mechanical strength and integrity to the part during processing and handling (e.g., depowdering and sintering). In various embodiments, the particular pattern can be determined by performing (e.g., with software on the control system 42) a finite element analysis to select a suitable pattern based on, for example, processing, handling, and loads to be applied to the green and/or brown body part.

The method 100 may repeat the steps of depositing a layer of powder material (not shown) and selectively depositing the binder solution 36 into the layer of powder material according to the predetermined pattern to continue building up the part in a layer-by-layer manner until a desired number of layers have been printed and a layer for the second surface 204 (e.g., edge boundary of the part) is to be printed, thereby enclosing the areas in which the binder solution was deposited according to the predetermined pattern. Then, the method 100 repeats the step of depositing a layer of powder material and returns to block 104, selectively depositing binder solution 36 into the layer of powder material 22 in a pattern representative of a structure of the part at locations corresponding to the second surface 204. As with the printing of the first surface described above, the method 100 may repeat the steps of depositing a layer of powder material (not shown) and selectively depositing the binder solution 36 into the layer of powder material to continue building up the part in a layer-by-layer manner until a desired number of layers have been printed along the second surface 204 to form an edge boundary of the part. The printing of the edges corresponding to the first surface 202 and the second surface 204, along with the side edges, defines the geometry of the part.

It should be appreciated that this process may be repeated for each of the plurality of the regions. Depending on the orientation of each region with respect to the other regions, in embodiments, each layer of the part may include portions of one or more of the regions. Accordingly, the printing of one layer of the part may include selectively depositing a binder solution 36 into the layer of powder material 22 in a pattern representative of a structure of the part at locations corresponding to the first surface of a first region and selectively depositing the binder solution according to a predetermined pattern at locations between the first surface and the second surface of a second region before depositing another layer of powder material.

At block 108, loose powder external to the geometry of the part is removed, thereby exposing a green body part. Powder removal can be accomplished by, for example, application of pressurized gas to blow the loose powder away from the green body part, application of a negative pressure (e.g., vacuum) to such the loose powder away from the green body part, vibration of the working surface 32, or combinations thereof. Other powder removal processes known to those in the art may be used.

It should be appreciated that, because the binder solution 36 is deposited according to a pattern between the first and second surfaces 202, 204, the green body part contains unbound powder within the surfaces (e.g., walls or shell) that define the geometry of the part. However, because the surfaces are printed by fully binding the powder continuously over the surface, the unbound powder within the walls is contained within the geometry of the part and is unremovable through the powder removal process.

In embodiments, the method 100 continues with optionally curing the binder (optional block 110). For example, in embodiments, the binder solution 36 is a mixture of a thermoplastic binder and at least one solvent. In various embodiments, polymer strands of the thermoplastic binder are coupled together via interaction between the first and second functional groups of the first and second polymer strands, respectively, with heat facilitating the coupling. Mechanisms that can be used to facilitate curing depend on the particular binder, and can include, by way of example and not limitation, UV light application, or thermal activation.

For example, while a portion of the solvent in the binder solution 36 may be evaporated during deposition (e.g., printing) of the binder solution 36, a certain amount of the solvent may remain within the layer of the powder material 22. Therefore, in embodiments, the binder solution 36 may be thermally cured at a temperature that is suitable for evaporating the solvent and allowing efficient bonding of the printed layers, thereby forming the green body part. Heat may be applied to the green body part using an IR lamp and/or heated plate, or may be carried out by placing the green body part in an oven. It should be noted that the application of the binder solution according to a predetermined pattern as described herein results in the deposition of less binder, which in turn can lead to a shorter cure time as compared to conventional printing methods in which binder is deposited uniformly throughout the green body part.

Unbound particles from the powder layer (e.g., the powder material that is not bonded by the binder solution 36) may be removed before or after the curing step of block 110 to prepare the green body part for post-processing steps such as debinding and sintering.

In various embodiments, a green body part formed using the binder solutions described herein exhibit a green body strength of greater than or equal to 10 MPa on each of the x- and y-printed orientations. As used herein, the "x-orientation" refers to a part having a largest dimension (e.g., length) along the x-axis, and the "y-orientation" refers to a part having a largest dimension (e.g., length) along the y-axis. As used herein, unless otherwise specified, the "x-axis" is the direction in which the print head moves with respect to the build plate on which the green body part is manufactured. As used herein, the "y-axis" is a direction perpendicular to the x-axis, such that each layer of the green body part lies within an x-y plane. The "z-axis" is an axis normal to the x-y plane, where layers are stacked on one another along the z-axis. For example, the green body part may exhibit a green body strength of from greater than or equal to 10 MPa to less than or equal to 25 MPa, from greater than or equal to 10 MPa to less than or equal to 20 MPa, from greater than or equal to 12 MPa to less than or equal to 25 MPa, or from greater than or equal to 12 MPa to less than or equal to 20 MPa, as measured in accordance with a 3-point bend test.

In the embodiment depicted in FIG. 1, the method 100 includes optionally removing (e.g., debinding) a portion of the binder from the green body part to generate a brown body part (block 112). In various embodiments, the binders provide strength (e.g., green body strength) to the green body part and, as such, only a portion (i.e., less than all) of the binder is removed during debinding of the green body part to improve the handling strength of the resulting brown body part before sintering.

During the debinding at block 112, the green body part is heated to break down a portion of the binder. For example, the green body part may be heated to a temperature that is about 600° C. or less, or about 450° C. or less. In embodiments, the green body part is heated to a temperature of from 250° C. to 450° C. The heating can be performed, for example, in an oxygen-free environment (e.g., in a vacuum, or inert atmosphere or combination of both), or in air for ceramic part sintering. In embodiments in which the debinding is performed in an inert atmosphere, argon, nitrogen, or another substantially inert gas may be used. In some embodiments, the debinding step may be combined with the sintering step to in order to make the final consolidated part.

According to various embodiments, the debinding step of block 112 is effective to remove greater than about 95% of the binder. For example, greater than or equal to 95%, greater than or equal to 96%, greater than or equal to 97%, greater than or equal to 98%, or greater than or equal to 99% of the total amount of binder is removed during debinding. In some embodiments, the portion of the binder that remains in the brown body part is less than or equal to 5%, less than or equal to 4%, less than or equal to 3%, less than or equal to 2%, or less than or equal to 1% of the amount of binder that was present prior to the debinding step. In embodiments, the portion of the binder that remains in the brown body part is from 0.05% to 2% or from 0.1% to 1% of the amount of binder that was present prior to the debinding step and is removed in the later stage of sintering process (e.g., beyond 600° C. and into the higher sintering temperatures as described in accordance with block 114 for stainless steel, nickel alloys, and the like).

It should be noted that the application of the binder solution according to a predetermined pattern as described herein results in the deposition of less binder, which in turn can lead to a shorter debinding time as compared to conventional printing methods in which binder is deposited uniformly throughout the green body part. In particular, because the binder is concentrated near the surface of the green body part, less time is associated with removal of binder from the interior of the part. Moreover, different binders, including binders that can provide increased green strength but require longer debinding cycles as compared to conventional binders, such as those binders described herein, can be employed since the longer debinding cycle required by the binder can be offset by the shortened debinding time realized by depositing less binder within the interior of the part.

Following debinding at block 112, the method 100 continues with sintering the brown body part to form the consolidated part (block 114). During sintering, the remaining portion of the binder is removed from the brown body part and the particles of metal powder are consolidated to form the consolidated part. Sintering imparts strength and integrity to the brown body part such that the consolidated part is suitable for use in machinery, for example.

In some embodiments, sintering may be performed according to a two-step process including a pre-sintering step in which the remaining portion of the binder is removed and a sintering step in which the metal powder particles are consolidated. In some embodiments, sintering may be performed as a single step. During sintering, the brown body part is heated to temperatures of greater than 500° C., greater than 800° C., or greater than 1000° C. In embodiments, heat may be applied by placing the brown body part in a furnace, or by exposing the brown body part to a concentrated source of energy, such as a laser beam, an electron beam, or another suitable energy source, depending on the particular embodiment.

Figure 2H:
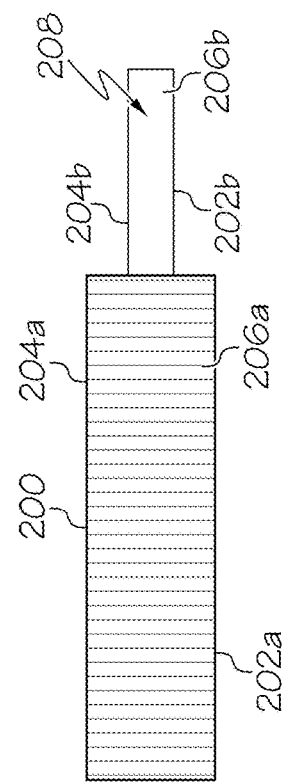
FIG. 2H is a schematic cross-section of a part having two regions, in one of which binder is deposited according to another predetermined pattern between surfaces of the part and the other of which is fully printed with binder according to one or more embodiments shown and described herein.
Figure 2G:
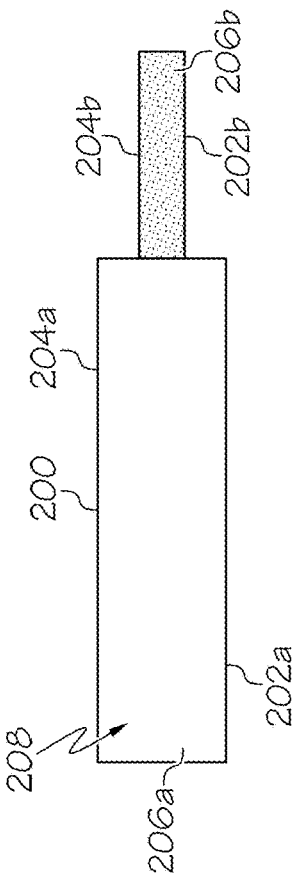
FIG. 2G is a schematic cross-section of a part having two regions, one of which contains unbound powder is contained between surfaces of the part and the other of which is fully printed with binder according to one or more embodiments shown and described herein.

Although method 100 is described as including block 106 in which binder is deposited in a predetermined pattern, it is contemplated that, in one or more regions of the part, a determination of the thickness of the region in block 102 can lead to a determination that no binder should be deposited at locations between the first surface and the second surface of that particular region, as shown in FIGS. 2B, 2G, and 2H. Accordingly, the method 100 can proceed directly from block 104 to block 108 (not shown) and the binder can be selectively deposited only at regions corresponding to the edges of the region, leaving the powder within the thickness of the walls of the green body part completely unbound. Similarly, it is contemplated that, in one or more regions of the part, a determination of the thickness of the region in block 102 can lead to a determination that binder should be deposited between the first surface and the second surface of that particular region to bind substantially all of the powder between the first and second surfaces, as shown in FIGS. 2A, 2F, and 2G. Accordingly, the method 100 can proceed directly from block 104 to block 108 (not shown) and the binder can be selectively deposited uniformly throughout the thickness of the walls of the green body part for the region. It should be understood that because each region is analyzed in method 100, in some embodiments, one or more regions can be printed with a predetermined pattern, one or more regions can be printed only at regions corresponding to the edges of the region, and one or more regions can be printed such that binder is uniformly deposited throughout the thickness of the region.

In embodiments, in addition to, or as an alternative to, depositing the binder solution in a predetermined pattern, one or more settings of the additive manufacturing apparatus can be altered for locations between the first surface and the second surface as compared to locations forming an edge boundary of the region for at least one of the plurality of regions of the part. By way of example and not limitation, binder saturation or an amount of binder deposited, a temperature of the powder bed, a speed of a recoater, a lateral speed of the printhead, a number of passes made by the printhead, or the like can be altered to change the conditions of the additive manufacturing apparatus to more efficiently print the locations between the first surface and the second surface. Such embodiments can reduce the precision of the binding of the powder within the thickness of the walls and decrease the time to print the interior layers without needing to sacrifice the precision printing of the geometry-defining portions of the part. Accordingly, it is believed that such embodiments can result in increased throughput without adversely impacting part quality.

In addition to, or as an alternative to, depositing the binder solution in a predetermined pattern at locations between the first surface and the second surface, in embodiments, a sintering aid solution, such as the sintering aid solution described herein, is deposited at locations between the first surface and the second surface. Accordingly, during the manufacture of a part, method 400, shown in FIG. 4, can be performed.

Figure 4:
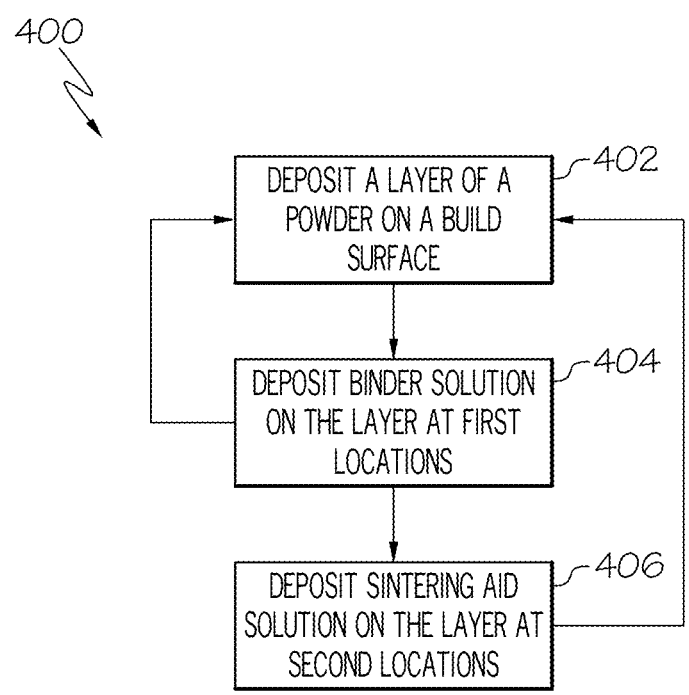
FIG. 4 is a flow diagram of an example method of manufacturing a part via additive manufacturing including depositing a sintering aid solution at locations between surfaces of the part according to one or more embodiments shown and described herein.

Although not shown in FIG. 4, it should be appreciated that manufacture of a part can include the steps of analyzing a computer model (e.g., CAD design) corresponding to the part and dividing the computer model into a plurality of regions, as well as determining a thickness of the part within a region (block 102 in FIG. 1). As above, based on the thickness of each region, the control system 42 determines how binder solution will be applied for each layer of the part. In various embodiments, the control system 42 identifies regions in which the thickness exceeds a threshold thickness and should not be printed in the conventional manner. As described above, for regions in which the maximum thickness is greater than or equal to the threshold thickness, the binder solution can be deposited at less than all locations corresponding to the final part, while a sintering aid solution is deposited at other locations corresponding to the final part.

In FIG. 4, building of the part begins by depositing a layer of a powder material 22 that is used to manufacture the part (block 402). In various embodiments, the layer of the powder material 22 is deposited on a working surface 32 of the additive manufacturing apparatus, as shown in FIG. 3. The powder material can be a metal powder, such as a nickel alloy, cobalt alloy, cobalt-chromium alloy, cast alloy, titanium alloy, aluminum-based materials, tungsten, stainless steel, or the like. Other powder materials may be used depending on the particular embodiment.

Next, the method 400 continues with selectively depositing a binder solution 36 into the layer of powder material 22 in a pattern representative of a structure of the part at locations corresponding to the first surface 202 (block 404). The binder solution 36 can be, for example, any one of various embodiments of the binder solution described herein. In various embodiments, the binder solution 36 is selectively printed using a print head 38 that is operated by the control system 42 based on the computer model that includes a representation of the layer of the part being printed.

In various embodiments, the control system 42 for controlling the print head 38 may include a distributed control system or any suitable device employing a general purpose computer or application-specific device. The control system 42 generally includes memory 44 storing one or more instructions for controlling operation of the print head 38. In embodiments, the memory 44 stores CAD designs representative of a structure of the part being manufactured. In embodiments, the CAD designs can include distortion compensation and, as such, the CAD design may not exactly match the geometry of the final desired part. Additionally, the control system 42 includes at least one processor 46 (e.g., microprocessor), and the memory 44 may include one or more tangible, non-transitory, machine-readable media collectively storing instructions executable by the processor 46 to control actions described herein.

After the binder solution 36 is selectively deposited into the layer of powder material 22, the binder in the binder solution 36 at least partially coats an outer surface of powder particles, thereby generating binder-coated particles 28. As will be described, the binder bonds the binder-coated particles 28 according to the pattern of the binder solution 36 printed into the layer of powder material 22 to form a layer of the green body part.

The method 400 may repeat the steps of depositing a layer of powder material (not shown) and selectively depositing the binder solution 36 into the layer of powder material to continue building up the part in a layer-by-layer manner until a desired number of layers have been printed along the first surface 202 to form an edge boundary of the part. Accordingly, the edge boundary of the part is formed according to conventional additive manufacturing techniques. In embodiments, one or more layers may be printed to bind powder material along the first surface 202. The binder of the binder solution 36 bonds each successive layer and provides a certain degree of strength (e.g., green body strength) to the green body part such that the integrity of the structure of the green body part is maintained during post-printing processes (e.g., transferring, inspecting, and/or depowdering). That is, the green body strength provided by the binder of the binder solution 36 maintains bonding between the particles of the powder material 22 within the layers and blocks (e.g., resists and/or prevents) delamination of the layers during handling and post-printing processing of the green body part. Accordingly, the thickness of the edge (e.g., the number of layers printed to form the first surface 202) may vary depending the cross-section of the region, the size of the part, the expected green and/or brown strength, and the expected distortion during sintering. As described above, the thickness of the edge is a determination made by the control system 42 based on a balancing of these factors.

Next, for layers in which the control system 42 has determined that a sintering aid solution will be applied, the method 400 may repeat the steps of depositing a layer of powder material (block 402), followed by selectively depositing the binder solution 36 into the layer of powder material at locations corresponding to edges (e.g., side edges extending between the first surface and the second surface) of the part (block 404).

In areas that will be contained within or bound by the surfaces 202, 204 of the part (e.g., areas that form the bulk of the thickness 206 of the walls of the part), the sintering aid solution 54 is deposited (block 406). As described in greater detail herein, the sintering aid solution 54 includes one or more sintering aids 56 dissolved in a solvent. As will be described, the sintering aid(s) enable an increased brown strength following removal of the binder material. In various embodiments, the sintering aid solution 54 is deposited using a print head 58 that is different from the print head 38 used to deposit the binder solution 36, as shown in FIG. 3. Because the sintering aid solution 54 is being applied to locations that do not define the geometry of the part (e.g., the edges), the print head 58 that is used to deposit the sintering aid solution 54 can be less precise (and, therefore, less expensive) than the print head 38 used to deposit the binder solution 36. As described in greater detail below, in various embodiments, the sintering aid solution 54 is substantially free of polymers. Accordingly, the print head 58 used to deposit the sintering aid solution 54 can be cleaned or subjected to maintenance processes less frequently as compared to the print head 38, since the polymers of the binder solution 36 are conventionally the source of print head clogs. Although the print head 58 is shown as depositing the sintering aid solution 54, it is contemplated that a sprayer or other deposition mechanism can be used to deposit the sintering aid solution 54.

Figure 5A:
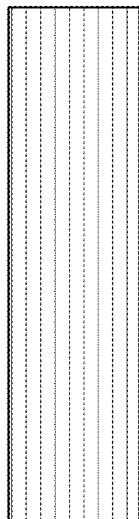
FIG. 5A is a schematic cross-section of a region of a part in which sintering aid solution is deposited according to a predetermined pattern between surfaces of the part according to one or more embodiments shown and described herein.
Figure 5B:
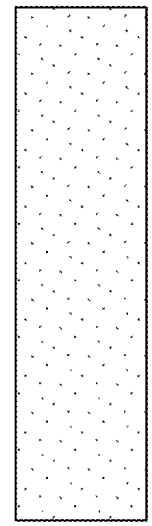
FIG. 5B is a schematic cross-section of a region of a part in which sintering aid solution is deposited according to another predetermined pattern between surfaces of the part according to one or more embodiments shown and described herein.
Figure 5C:
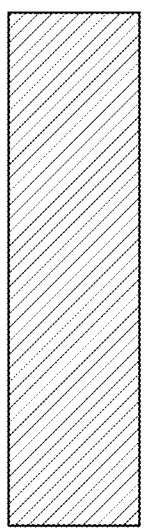
FIG. 5C is a schematic cross-section of a region of a part in which sintering aid solution is deposited according to another predetermined pattern between surfaces of the part according to one or more embodiments shown and described herein.
Figure 5D:
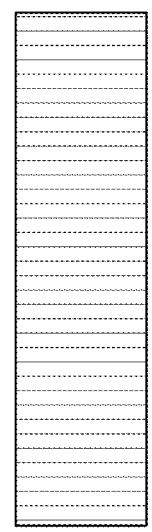
FIG. 5D is a schematic cross-section of a region of a part in which sintering aid solution is deposited according to another predetermined pattern between surfaces of the part according to one or more embodiments shown and described herein.

In embodiments, the sintering aid solution 54 can be deposited at all of the locations that do not define the geometry of the part but correspond to the sintered part (e.g., locations corresponding to a thickness of the part), or the sintering aid solution 54 can be deposited according to a predetermined pattern, as with the binder solution in the method 100. FIGS. 5A-5D provide some, but not all, of the possible patterns in which the sintering aid solution can be deposited. For example, in FIG. 5A, the sintering aid solution can be deposited to form diagonal lines between the first surface and the second surface. Alternatively, the sintering aid solution can be deposited on some, but not all, layers of the powder, thereby forming horizontal layers of the sintering aid solution within the powder, as shown in FIG. 5B. In other embodiments, the sintering aid solution can be deposited within each layer to form vertical lines, in FIG. 5C. In still other embodiments, the sintering aid solution can be deposited at alternating locations in alternating layers such that neither vertical nor horizontal lines are formed, as shown in FIG. 5D. However, the incorporation of the sintering aid within the powder can provide additional brown strength as compared to embodiments in which neither sintering aid nor binder is deposited within the locations that do not define the geometry of the part. In various embodiments, following debinding, the binder in the part is removed from the part to form a brown body part that has a brown strength of greater than about 1 MPa, greater than about 2 MPa, or greater than about 3 MPa. In embodiments, the brown body part has a brown strength of from about 1 MPa to about 3 MPa.

The method 400 then continues by returning to block 402 and depositing another layer of powder. The method 400 is repeated until the second surface 204 is reached, and the second surface 204 is printed, at which point the method 400 ends. Further processing of the part includes, for example, removing loose powder external to the geometry of the part (block 108), curing (block 110), debinding (block 112) and sintering (block 114), as shown in FIG. 1. Accordingly, it should be understood that method 400 can be performed in addition to or in place of blocks 104 and 106 in method 100.

As described above, methods 100 and 400 can enable a reduced amount of binder to be deposited within interior portions of a part, which can lead to reduced debind times and greater throughput. However, reduction in the amount of binder deposited within a part can result in a decrease in green strength and/or brown strength. Accordingly, in various embodiments, binder materials and sintering aids can be selected to provide increased green strength and/or brown strength. Advantageously, in embodiments, the methods described herein can enable the use of materials that might be otherwise unsuitable for use in additive manufacturing, such as due to their extended debinding times or propensity to result in cracked parts.

Binder Solutions

In various embodiments described herein, a binder solution is deposited on a layer of powder at less than all locations at which powder is sintered to form a final part. In embodiments, the binder solution includes a relatively high amount (e.g., greater than or equal to 93 wt %) of a monomer polymerized by a thermal initiator and at least one of a super acid generating initiator, a photo-thermal initiator, and a photoinitiator, which increases printing speed and improves the green strength of the printed part.

In particular, various embodiments of binders comprise greater than or equal to 93 wt % and less than or equal to 99.8 wt % of a monomer, greater than or equal to 0.1 wt % and less than or equal to 2 wt % of a thermal initiator, and greater than or equal to 0.1 wt % and less than or equal to 3 wt % of at least one of a super acid generating initiator, a photo-thermal initiator, and a photoinitiator. The monomer comprises at least one of a difunctional monomer and a monofunctional monomer. Various embodiments of binders will be referred to herein with specific reference to the appended drawings.

Conventional print binder solutions may not enable increased printing speeds or provide the green strength necessary to prevent damage and distortion to the printed part during the post-printing processes. Specifically, conventional print binder solutions include a relatively high amount of solvent and a relatively lower amount of thermoplastic polymers. Relatively high amounts of solvent will take longer to evaporate during curing, which decreases printing speeds, thereby reducing output of the machine. Moreover, the strength of a green body part is provided by the print binder along with some contribution from particle friction and mechanical interlocking of the particles. The strength provided by the print binder is due to weak non-covalent forces formed between the thermoplastic polymer strands (e.g., as with polymeric binders). Relatively low amounts of thermoplastic polymer limit the green strength that may be achieved by the printed part and may lead to warping or even mechanical failure of the part.

In additive manufacturing processes including binder jetting, a print binder is jetted from a printer head onto successive layers of a print powder to join particles of a print powder to form a printed three-dimensional part. As discussed herein, in embodiments, it may be desirable to have a relatively higher printing speed. As further discussed herein, in embodiments, subsequent processing (e.g., debinding and sintering) may be needed to transform the printed three-dimensional part into a consolidated part. Accordingly, it may be desirable for the printed part to have a suitable green strength for handling (e.g., transferring, inspecting, depowdering). This reduces the occurrence of warping or part failure prior to consolidation, thereby improving manufacturing throughput and reducing manufacturing costs. Accordingly, various embodiments of binders disclosed herein include a relatively high amount (e.g., greater than or equal to 93 wt %) of a monomer polymerized by a thermal initiator and at least one of a super acid generating initiator, a photo-thermal initiator, and a photoinitiator, which increases the amount of strength that the binder imparts to the green body part. Additionally, because the embodiments of binders disclosed herein are neat (i.e., do not include a solvent), the curing step may be reduced or eliminated, leading to increased printing speeds.

As set forth above, the binders described herein comprise a monomer, a thermal initiator, and at least one of a super acid generating initiator, a photo-thermal initiator, and a photoinitiator. The thermoplastic polymer that is formed through polymerization of the monomer in the presence of the initiator, imparts strength to the green body part by binding the particulate material and layers thereof. In embodiments, the formed thermoplastic polymer is selected from a class of thermoplastic polymers that generally decompose into small oligomers, carbon dioxide, and water without requiring the presence of oxygen. Accordingly, in embodiments, the resulting thermoplastic polymer may be cleanly and readily removed during debinding and sintering to generate a consolidated part that is substantially free of the binder and decomposition products (e.g., char and metal oxides).

In embodiments, the monomer includes at least one of a difunctional monomer and a monofunctional monomer. For example, in embodiments, the monomer includes at least one difunctional monomer that, when polymerized by the initiator, forms a crosslinked polymer network (e.g., thermoset product). In embodiments, the monomer includes at least one difunctional monomer and at least one monofunctional monomer that, when polymerized by the initiator, form a crosslinked polymer network (e.g., thermoset product). In embodiments, the monomer includes at least one monofunctional monomer that, when polymerized by the initiator, forms a network of independent polymers (e.g., thermoplastic product). In embodiments, the monomer includes both: (1) at least one difunctional monomer or at least one difunctional monomer and at least one monofunctional monomer; and (2) at least one monofunctional monomer that, when polymerized by the initiator, forms a first independent crosslinked polymer network and a second polymer network of independent polymers. The first independent crosslinked polymer network is composed of the at least one difunctional monomer or the at least one difunctional and the at least one monofunctional monomer (e.g., thermoset product). The second polymer network of independent polymers is composed of the at least one monofunctional monomer (e.g., thermoplastic product).

The selection of a difunctional monomer, monofunctional monomer, or combinations thereof may depend on the desired strength of the green body part and the acceptable amount of char after the binder is burned out. For example, in embodiments, a crosslinked polymer network imparts a relatively high strength to the green body part, but may result in a relatively high amount of char after being burned out due to the thermoset nature of the network. In embodiments, a network of independent polymers imparts a relatively lower amount of strength as compared to the crosslinked polymer network, but may result in a relatively low amount of char due to the thermoplastic nature of the network. In embodiments, a first independent crosslinked polymer network and a second polymer network of independent polymers imparts a relatively high strength to the green part and may result in a relatively moderate amount of char due to the differential burning of the crosslinked polymer network and network of independent polymers.

In embodiments, the monomer comprises, by way of example and not limitation, monoacrylate monomers, diacrylate monomers, monovinyl ether monomers, divinyl ether monomers, monofunctional epoxy monomers, monofunctional N-vinyl monomers, difunctional epoxy monomers, or combinations thereof. In embodiments, the diacrylate monomers comprise neopentyl glycol propoxylate diacrylate, di(ethylene glycol) diacrylate, 1,6-hexanediol diacrylate (HDDA), tri(propylene glycol) diacrylate, or combinations thereof. In embodiments, the epoxy monomers comprise 3,4-epoxycyclohexylmethyl; 3,4-epoxycyclohexanecarboxylate; diglycidyl 1,2-cyclohexanedicarboxylate; 1,2,7,8-diepoxyoctane; dicyclopentadiene dioxide; 1,4-butanediol diglycidyl ether; glycidyl 2-methylphenyl ether; 1,2-epoxydodecane; or combinations thereof. In embodiments, the monovinyl ether monomers comprise ethyl VE, cyclohexyl VE, or combinations thereof. In embodiments, the divinyl ether (DVE) monomers comprise 1,4-cyclohexanedimethanol DVE, triethyelene glycol (TEG) DVE, diethyelene glycol (DEG) DVE, or combinations thereof. In embodiments, the monofunctional N-vinyl comprise acryloyl morpholine, cinyl methyl oxazolidinone, vinyl pyrrolidone, or combinations thereof.

In embodiments, the binder comprises a relatively high amount of monomer (e.g., greater than or equal to 93 wt %) such that the desired strength is imparted to the green body part. In embodiments, the binder comprises greater than or equal to 93 wt % and less than or equal to 99.8 wt % of the monomer, based on a total weight of the binder. In embodiments, the amount of monomer in the binder, based on a total weight of the binder, may be greater than or equal to greater than or equal to 93 wt %, greater than or equal to 93.5 wt %, greater than or equal to 95 wt %, greater than or equal to 94.5 wt %, greater than or equal to 95 wt %, greater than or equal to 95.5 wt %, greater than or equal to 96 wt %, greater than or equal to 96.5 wt %, greater than or equal to 97 wt %, greater than or equal to 97.5 wt %, greater than or equal to 98 wt %, greater than or equal to 98.5 wt %, greater than or equal to 99 wt %. In embodiments, the amount of monomer, based on a total weight of the binder, may be less than or equal to 99.8 wt %, less than or equal to 99.7 wt %, less than or equal to 99.6 wt %, or even less than or equal to 99.5 wt %. For example, the amount of monomer that may be in the binder, based on a total weight of the binder, may be greater than or equal to 93 wt % and less than or equal to 99.8 wt %, greater than or equal to 93 wt % and less than or equal to 99.7 wt %, greater than or equal to 93 wt % and less than or equal to 99.6 wt %, greater than or equal to 93 wt % and less than or equal to 99.5 wt %, greater than or equal to 93.5 wt % and less than or equal to 99.8 wt %, greater than or equal to 93.5 wt % and less than or equal to 99.7 wt %, greater than or equal to 93.5 wt % and less than or equal to 99.6 wt %, greater than or equal to 93.5 wt % and less than or equal to 99.5 wt %, greater than or equal to 94 wt % and less than or equal to 99.8 wt %, greater than or equal to 94 wt % and less than or equal to 99.7 wt %, greater than or equal to 94 wt % and less than or equal to 99.6 wt %, greater than or equal to 94 wt % and less than or equal to 99.5 wt %, greater than or equal to 94.5 wt % and less than or equal to 99.8 wt %, greater than or equal to 94.5 wt % and less than or equal to 99.7 wt %, greater than or equal to 94.5 wt % and less than or equal to 99.6 wt %, greater than or equal to 94.5 wt % and less than or equal to 99.5 wt %, greater than or equal to 95 wt % and less than or equal to 99.8 wt %, greater than or equal to 95 wt % and less than or equal to 99.7 wt %, greater than or equal to 95 wt % and less than or equal to 99.6 wt %, greater than or equal to 95 wt % and less than or equal to 99.5 wt %, greater than or equal to 95.5 wt % and less than or equal to 99.8 wt %, greater than or equal to 95.5 wt % and less than or equal to 99.7 wt %, greater than or equal to 95.5 wt % and less than or equal to 99.6 wt %, greater than or equal to 95.5 wt % and less than or equal to 99.5 wt %, greater than or equal to 96 wt % and less than or equal to 99.8 wt %, greater than or equal to 96 wt % and less than or equal to 99.7 wt %, greater than or equal to 96 wt % and less than or equal to 99.6 wt %, greater than or equal to 96 wt % and less than or equal to 99.5 wt %, greater than or equal to 96.5 wt % and less than or equal to 99.8 wt %, greater than or equal to 96.5 wt % and less than or equal to 99.7 wt %, greater than or equal to 96.5 wt % and less than or equal to 99.6 wt %, greater than or equal to 96.5 wt % and less than or equal to 99.5 wt %, greater than or equal to 97 wt % and less than or equal to 99.8 wt %, greater than or equal to 97 wt % and less than or equal to 99.7 wt %, greater than or equal to 97 wt % and less than or equal to 99.6 wt %, greater than or equal to 97 wt % and less than or equal to 99.5 wt %, greater than or equal to 97.5 wt % and less than or equal to 99.8 wt %, greater than or equal to 97.5 wt % and less than or equal to 99.7 wt %, greater than or equal to 97.5 wt % and less than or equal to 99.6 wt %, greater than or equal to 97.5 wt % and less than or equal to 99.5 wt %, greater than or equal to 98 wt % and less than or equal to 99.8 wt %, greater than or equal to 98 wt % and less than or equal to 99.7 wt %, greater than or equal to 98 wt % and less than or equal to 99.6 wt %, greater than or equal to 98 wt % and less than or equal to 99.5 wt %, greater than or equal to 98.5 wt % and less than or equal to 99.8 wt %, greater than or equal to 98.5 wt % and less than or equal to 99.7 wt %, greater than or equal to 98.5 wt % and less than or equal to 99.6 wt %, greater than or equal to 98.5 wt % and less than or equal to 99.5 wt %, greater than or equal to 99 wt % and less than or equal to 99.8 wt %, greater than or equal to 99 wt % and less than or equal to 99.7 wt %, greater than or equal to 99 wt % and less than or equal to 99.6 wt %, or even greater than or equal to 99 wt % and less than or equal to 99.5 wt %, or any and all sub-ranges formed from any of these endpoints.

The binder further includes a thermal initiator. The thermal initiator may impart a relatively higher strength to the green body part as compared to a conventional binder because the thermal initiator initiates polymerization in the deeper layers of particulate material as long as the thermal decomposition temperature of the thermal initiator is maintained (e.g., maintain threshold heat underneath the powder bed).

In embodiments, the thermal initiator has a thermal decomposition temperature greater than or equal to 40° C. and less than or equal to 150° C. In embodiments, the thermal initiator has a thermal decomposition temperature greater than or equal to 65° C. and less than or equal to 100° C. In embodiments, the thermal decomposition temperature of the thermal initiator may be greater than or equal to 40° C., greater than or equal to 50° C., greater than or equal to 60° C., or even greater than or equal to 65° C. In embodiments, the thermal decomposition temperature of the thermal initiator may be less than or equal to 150° C., less than or equal to 125° C., or even less than or equal to 100° C. For example, the thermal decomposition temperature of the thermal initiator may be greater than or equal to 40° C. and less than or equal to 150° C., greater than or equal to 40° C. and less than or equal to 125° C., greater than or equal to 40° C. and less than or equal to 100° C., greater than or equal to 50° C. and less than or equal to 150° C., greater than or equal to 50° C. and less than or equal to 125° C., greater than or equal to 50° C. and less than or equal to 100° C., greater than or equal to 60° C. and less than or equal to 150° C., greater than or equal to 60° C. and less than or equal to 125° C., greater than or equal to 60° C. and less than or equal to 100° C., greater than or equal to 65° C. and less than or equal to 150° C., greater than or equal to 65° C. and less than or equal to 125° C., or even greater than or equal to 65° C. and less than or equal to 100° C., or any and all sub-ranges formed from these endpoints.

In embodiments, the thermal initiator includes a radical based thermal initiator, a cationic based initiator, or combinations thereof. In embodiments, the radical based thermal initiator comprises 2,2'-azobisisobutyronitrile (AIBN); benzoyl peroxide, 1,1'-azobis(cyclohexanecarbonitrile) (ACHN); 4,4-azobis(4-cyanovaleric acid) (ACVA); tert-butyl peroxide; cumene hydroperoxide; tert-butyl peroxybenzoate; cyclohexanone peroxide; lauroyl peroxide; dicumyl peroxide; peracetic acid; or combinations thereof. In embodiments, the cationic based thermal initiator comprises a blocked ammonium antimony hexafluoride catalyst (e.g., K-PURE CXC-1612), benzyl(4-hydroxyphenyl) methyl sulfonium hexafluoroantimonate, diphenyl(methyl) sulfonium tetrafluoroborate, cyclohexyl p-toluenesulfonate, 2,5-dimethyl-2,5-di-(2-ethylhexanoylperoxy) hexane (e.g., Luperox 256), tert-amyl peroxypivalate (e.g., Luperox 554), or combinations thereof.

In embodiments, the binder comprises greater than or equal to 0.1 wt % and less than or equal to 2 wt % of a thermal initiator, based on a total weight of the binder. In embodiments, the binder may comprise greater than or equal to 0.1 wt %, greater than or equal to 0.2 wt %, greater than or equal to 0.3 wt %, greater than or equal to 0.4 wt %, or even greater than or equal to 0.5 wt % of the thermal initiator, based on a total weight of the binder. In embodiments, the binder may comprise less than or equal to 2 wt %, less than or equal than or equal to 1.5 wt %, or even less than or equal to 1 wt % of the thermal initiator, based on a total weight of the binder. For example, the binder may comprise greater than or equal to 0.1 wt % and less than or equal to 2 wt %, greater than or equal to 0.1 wt % and less than or equal to 1.5 wt %, greater than or equal to 0.1 wt % and less than or equal to 1 wt %, greater than or equal to 0.2 wt % and less than or equal to 2 wt %, greater than or equal to 0.2 wt % and less than or equal to 1.5 wt %, greater than or equal to 0.2 wt % and less than or equal to 1 wt %, greater than or equal to 0.3 wt % and less than or equal to 2 wt %, greater than or equal to 0.3 wt % and less than or equal to 1.5 wt %, greater than or equal to 0.3 wt % and less than or equal to 1 wt %, greater than or equal to 0.4 wt % and less than or equal to 2 wt %, greater than or equal to 0.4 wt % and less than or equal to 1.5 wt %, greater than or equal to 0.4 wt % and less than or equal to 1 wt %, greater than or equal to 0.5 wt % and less than or equal to 2 wt %, greater than or equal to 0.5 wt % and less than or equal to 1.5 wt %, or even greater than or equal to 0.5 wt % and less than or equal to 1 wt %, or any and all sub-ranges formed from any of these endpoints, of the thermal initiator, based on a total weight of the binder.

In embodiments, in addition to a thermal initiator, the initiator may comprise a photoinitiator. The combination of a thermal initiator and photoinitiator (i.e., physical mixture of separate initiator molecules) may impart a relatively higher strength to the green body part as compared to a conventional binder or a binder that only includes a thermal initiator. In embodiments, the combination of a thermal initiator and a photoinitiator may be initiated by ultraviolet light, heat, or a combination thereof. For example, application of ultraviolet light may excite the photoinitiator and initiate polymerization in the upper layers (e.g., layers located 1 μm to 250 μm into the thickness of particulate material as measured from a top surface of the particulate material) of particulate material and application of heat may excite the thermal initiator and initiate polymerization in the deeper layers (e.g., layers located 250 μm to 75 cm into thickness of particulate material as measured from a top surface of the particulate material) of particulate material, thereby imparting strength throughout the green body part and resulting in a relatively higher amount of green strength as compared to a conventional binder or a binder that only includes a thermal initiator. In other embodiments, application of ultraviolet light may excite the photoinitiator and initiate polymerization in the upper layers of particulate material. The crosslinking of monomers in the upper layers may generate enough thermal energy to be above the thermal decomposition temperature of the thermal initiator such that the thermal initiator decomposes and initiates polymerization in the deeper layers of particulate material without external heat being applied. In embodiments, the photoinitiator enables a relatively quick polymerization and stiffening of the upper layers to aid faster recoating while the thermal initiator enables polymerization in the deeper layers while print process is continuing.

In embodiment, the photoinitiator includes a cationic based photoinitiator. In embodiments, the cationic based photoinitiator includes, by way of example and not limitation, aryl sulfonium salts, benzyl p-hydroxyphenyl methyl sulfonium salts, aryl iodonium salts (e.g., diphenyliodonium hexafluoroantimonate salt or bis(4-tert-butylphenyl)iodonium hexafluorophosphate), cyclopentadienyl(p-cymene)ruthenium(II) hexafluorophosphate, ($\eta^6$-diphenylmethane) ($\eta^5$-cyclopentadienyl) iron hexafluorophosphate ($PhCH_2PhFe^+CpPF_6^-$), ($\eta^6$-benzophenone) ($\eta^5$-cyclopentadienyl) iron hexafluorophosphate ($PhCOPhFe^+CpPF_6^-$), or combinations thereof.

In embodiments, in addition to a thermal initiator, the initiator may comprise a super acid generating initiator. The combination of a thermal initiator and a super acid generating initiator may impart a relatively higher strength to the green body part as compared to a conventional binder or a binder that only includes a thermal initiator. In embodiments, the combination of a thermal initiator and a super acid generating initiator may be initiated by ultraviolet light, heat, or a combination thereof. For example, application of ultraviolet light may excite the super acid generating initiator and initiate polymerization in the upper layers (e.g., layers located 1 μm to 250 μm into the thickness of particulate material as measured from a top surface of the particulate material) of particulate material and application of heat decomposes the thermal initiator and initiate polymerization in the deeper layers (e.g., layers located 250 μm to 75 cm into thickness of particulate material as measured from a top surface of the particulate material) of particulate material, thereby imparting strength throughout the green body part and resulting in a relatively higher amount of green strength as compared to a conventional binder or a binder that only includes a thermal initiator. In other embodiments, application of ultraviolet light may excite the super acid generating initiator and initiate polymerization in the upper layers of particulate material. The crosslinking of monomers in the upper layers may generate enough thermal energy to be above the thermal decomposition temperature of the thermal initiator such that the thermal initiator decomposes. The decomposition of the thermal initiator may not only initiate polymerization of the surrounding monomer, but also may decompose the super acid generating initiator, thereby forming a super acid product (e.g, $HSbF_6$). The super acid product may further initiate polymerization of the monomers in the deeper layers of particulate material. The tendency of a super acid to crosslink surrounding monomers at a relatively faster pace generate excess heat (i.e., exotherm energy), and initiates polymerization and crosslinking in the deeper layers of particulate material without external heat being applied. In embodiments, the super acid generating initiator enables a relatively quick polymerization and stiffening of the upper layers to aid faster recoating while the thermal initiator enables polymerization in the deeper layers while print process is continuing.

In embodiments, the super acid generating initiator includes, by way of example and not limitation, aryl sulfonium salts, aryl iodonium salts (e.g., diphenyliodonium hexafluoroantimonate salt, benzyl p-hydroxyphenyl methylsulfonium salts), or combinations thereof.

In embodiments, in addition to a thermal initiator, the initiator may comprise a photo-thermal initiator. The combination of a thermal initiator and a photo-thermal initiator may impart a relatively higher strength to the green body part as compared to a conventional binder or a binder that only includes a thermal initiator as a combination of cationic photopolymerization and radical thermal polymerization monomers may be employed. In embodiments, the combination of a thermal initiator and a photoinitiator may be initiated by ultraviolet light, heat, or a combination thereof. For example, application of ultraviolet light may excite the photo-thermal initiator and initiate polymerization in the upper layers (e.g., layers located 1 μm to 250 μm into the thickness of particulate material as measured from a top surface of the particulate material) of particulate material and application of heat may excite the photo-thermal initiator and/or the thermal initiator and initiate polymerization in the deeper layers (e.g., layers located 250 μm to 75 cm into thickness of particulate material as measured from a top surface of the particulate material) of particulate material, thereby imparting strength throughout the green body part and resulting in a relatively higher amount of green strength as compared to a conventional binder or a binder that only includes a thermal initiator. In other embodiments, application of ultraviolet light may excite the photo-thermal initiator and initiate polymerization in the upper layers of particulate material. The crosslinking of monomers in the upper layers may generate enough thermal energy to be above the thermal decomposition temperature of the photo-thermal initiator and the thermal initiator such that the photo-thermal initiator and the thermal initiator decomposes and initiates polymerization in the deeper layers of particulate material without external heat being applied. In other embodiments, heat may be applied without the application of ultraviolet light to decompose the photo-thermal initiator and/or thermal initiator and initiate polymerization in the upper layers of particulate material. This decomposition of the photo-thermal initiator and/or thermal initiator may also release heat to cause the temperature in deeper layers to exceed the thermal decomposition temperature of the photo-thermal initiator and/or thermal initiator, which further decomposes the photo-thermal initiator and/or thermal initiator and initiates polymerization in the deeper layers of particulate material. In embodiments where the decomposition of the photo-thermal initiator and/or thermal initiator does not result in enough heat to exceed the thermal decomposition temperature of the photo-thermal initiator and/or thermal initiator, further heat may be applied at a greater temperature. In embodiments, the photoinitiator enables a relatively quick polymerization and stiffening of the upper layers to aid faster recoating while the thermal initiator enables polymerization in the deeper layers while print process is continuing.

In embodiments, the initiator comprises a photo-thermal initiator without a thermal initiator. Similar to the combination of a thermal initiator and photoinitiator, a photo-thermal initiator may impart a relatively higher strength to the green body part as compared to a conventional binder or a binder that only includes a thermal initiator. In particular, when exposed to an excitation source (e.g., ultraviolet light), the photo-thermal initiator decomposes and initiates polymerization in the upper layers of particulate material. The decomposition of the photo-thermal initiator also releases heat, which further decomposes the photo-thermal initiator and initiates polymerization in the deeper layers of particulate material, thereby imparting strength throughout the green body part and resulting in a relatively higher amount of overall strength.

In embodiments, the photo-thermal initiator comprises a diad type molecule (e.g., photoinitiator covalently attached to a thermal initiator) or a triad type molecule (e.g., 2 photoinitiators are attached to two ends of a thermal initiator). In embodiments, the photo-thermal initiator comprises a cationic based photo-thermal initiator. In embodiments, the photo-thermal initiator includes, by way of example and not limitation, iodonium salt-peroxide-iodonium salt triad, sulfonium salt-peroxide-sulfonium salt triad, or combinations thereof.

In embodiments, the initiator comprises a radical based thermal initiator and a super acid generating initiator.

In embodiments, the initiator comprises a radical based thermal initiator and a cationic based photo-thermal initiator.

In embodiments, the initiator comprises a cationic based thermal initiator and a cationic based photoinitiator.

In embodiments, the binder comprises greater than or equal to 0.1 wt % and less than or equal to 3 wt % of at least one of a super acid generating initiator, a photo-thermal initiator, and a photoinitiator, based on a total weight of the binder. In embodiments, the binder may comprise greater than or equal to 0.1 wt %, greater than or equal to 0.2 wt %, greater than or equal to 0.3 wt %, greater than or equal to 0.4 wt %, or even greater than or equal to 0.5 wt % of at least one of a super acid generating initiator, a photo-thermal initiator, and a photoinitiator, based on a total weight of the binder. In embodiments, the binder may comprise less than or equal to 3 wt %, less than or equal to 2.5 wt %, less than or equal to 2 wt %, less than or equal to 1.5 wt %, or even less than or equal to 1 wt % of at least one of a super acid generating initiator, a photo-thermal initiator, and a photoinitiator, based on a total weight of the binder. For example, the binder may comprise greater than or equal to 0.1 wt % and less than or equal to 3 wt %, greater than or equal to 0.1 wt % and less than or equal to 2.5 wt %, greater than or equal to 0.1 wt % and less than or equal to 2 wt %, greater than or equal to 0.1 wt % and less than or equal to 1.5 wt %, greater than or equal to 0.1 wt % and less than or equal to 1 wt %, greater than or equal to 0.2 wt % and less than or equal to 3 wt %, greater than or equal to 0.2 wt % and less than or equal to 2.5 wt %, greater than or equal to 0.2 wt % and less than or equal to 2 wt %, greater than or equal to 0.2 wt % and less than or equal to 1.5 wt %, greater than or equal to 0.2 wt % and less than or equal to 1 wt %, greater than or equal to 0.3 wt % and less than or equal to 3 wt %, greater than or equal to 0.3 wt % and less than or equal to 2.5 wt %, greater than or equal to 0.3 wt % and less than or equal to 2 wt %, greater than or equal to 0.3 wt % and less than or equal to 1.5 wt %, greater than or equal to 0.3 wt % and less than or equal to 1 wt %, greater than or equal to 0.4 wt % and less than or equal to 3 wt %, greater than or equal to 0.4 wt % and less than or equal to 2.5 wt %, greater than or equal to 0.4 wt % and less than or equal to 2 wt %, greater than or equal to 0.4 wt % and less than or equal to 1.5 wt %, greater than or equal to 0.4 wt % and less than or equal to 1 wt %, greater than or equal to 0.5 wt % and less than or equal to 3 wt %, greater than or equal to 0.5 wt % and less than or equal to 2.5 wt %, greater than or equal to 0.5 wt % and less than or equal to 2 wt %, greater than or equal to 0.5 wt % and less than or equal to 1.5 wt %, or even greater than or equal to 0.5 wt % and less than or equal to 1 wt %, or any and all sub-ranges formed from any of these endpoints, of at least one of a super acid generating initiator, a photo-thermal initiator, and a photoinitiator, based on a total weight of the binder.

In embodiments, the binder may further comprise a surfactant to dissolve the monomer and initiator. In embodiments, the surfactant may comprise, by way of example and not limitation, tetramethyl decynediol (TMDD) (e.g., TMDD 50% and TMDD 100%), oleic acid, or combinations thereof.

In embodiments, the binder comprises less than 1 wt % of the surfactant, based on a total weight of the binder. In embodiments, the binder may comprise less than or equal to 1 wt %, less than or equal to 0.8 wt %, less than or equal to 0.6 wt %, or even less than or equal to 0.4 wt % of the surfactant, based on a total weight of the binder. In embodiments, the binder may comprise greater than or equal 0 wt %, greater than 0 wt %, greater than or equal to 0.1 wt %, or even greater than or equal to 0.2 wt % of the surfactant, based on a total weight of the binder. For example, the binder may comprise greater than or equal to 0 wt % and less than or equal to 1 wt %, greater than or equal to 0 wt % and less than or equal to 0.8 wt %, greater than or equal to 0 wt % and less than or equal to 0.6 wt %, greater than or equal to 0 wt % and less than or equal to 0.4 wt %, greater than 0 wt % and less than or equal to 1 wt %, greater than 0 wt % and less than or equal to 0.8 wt %, greater than 0 wt % and less than or equal to 0.6 wt %, greater than 0 wt % and less than or equal to 0.4 wt %, greater than or equal to 0.1 wt % and less than or equal to 1 wt %, greater than or equal to 0.1 wt % and less than or equal to 0.8 wt %, greater than or equal to 0.1 wt % and less than or equal to 0.6 wt %, greater than or equal to 0.1 wt % and less than or equal to 0.4 wt %, greater than or equal to 0.2 wt % and less than or equal to 1 wt %, greater than or equal to 0.2 wt % and less than or equal to 0.8 wt %, greater than or equal to 0.2 wt % and less than or equal to 0.6 wt %, or even greater than or equal to 0.2 wt % and less than or equal to 0.4 wt %, or any and all sub-ranges formed from any of these endpoints, of the surfactant, based on a total weight of the binder.

In embodiments, the binder may optionally include a sensitizer to enable of ease excitation within the visible UV, UV-Vis and Visible spectrum of light greater than 385 nm and energy transfer to a deep UV photoinitiator such as a diaryliodonium hexafluoroantimonate salt (e.g., OMAN71). In embodiments, the sensitizer may comprise, by way of example and not limitation, 2-isopropylthioxanthene-9-one (ITX), benzophenone, nitro-benzophenone, anthracene, diphenylanthracene, perylene and other derivatives, metal-ligand complexes (e.g., ruthenium(II)polypyridyl complexes), or combinations thereof. In embodiments, the binder may comprise greater than or equal to 0 wt % or even greater than or equal to 0.05 wt % of the sensitizer, based on a total weight of the binder. In embodiments, the binder may comprise less than or equal less than or equal to 2 wt %, less than or equal to 1 wt % to 0.5 wt %, less than or equal to 0.3 wt %, or even less than or equal to 0.1 wt % of the sensitizer, based on a total weight of the binder. For example, the binder may comprise greater than or equal to 0 wt % and less than or equal to 2 wt %, greater than or equal to 0 wt % and less than or equal to 1 wt %, greater than or equal to 0 wt % and less than or equal to 0.5 wt %, greater than or equal to 0 wt % and less than or equal to 0.3 wt %, greater than or equal to 0 wt % and less than or equal to 0.1 wt %, greater than 0 wt % and less than or equal to 0.5 wt %, greater than 0 wt % and less than or equal to 0.3 wt %, greater than 0 wt % and less than or equal to 0.1 wt %, greater than or equal to 0.05 wt % and less than or equal to 2 wt %, greater than or equal to 0.05 wt % and less than or equal to 1 wt %, greater than or equal to 0.05 wt % and less than or equal to 0.5 wt %, greater than or equal to 0.05 wt % and less than or equal to 0.3 wt %, or even greater than or equal to 0.05 wt % and less than or equal to 0.1 wt %, or any and all sub-ranges formed from any of these endpoints of the sensitizer, based on a total weight of the binder.

In embodiments, the binder may optionally include a triplet sensitizer such as, by way of example and not limitation, 2-isopropylthioxanthene-9-one (ITX), benzophenone, nitro-benzophenone, anthracene, diphenylanthracene, perylene and other derivatives, metal-ligand complexes (e.g., ruthenium(II)polypyridyl complexes), or combinations thereof.

Sintering Aid Solution

As set forth above, in embodiments, methods of additively manufacturing a part include depositing a binder solution, such as one of the binder solutions described herein, on the layer of the powder at first locations to form edge boundaries of the part, and depositing a sintering aid solution on the layer of the powder at second locations that are contained within the edge boundaries of the part. Generally, the sintering aid solution comprises a sintering aid in a solvent. The incorporation of the sintering aid into the sintering aid solution can enable an increased brown strength following removal of the binder material, while providing a mode of deposition different from the binder solution, thereby reducing the amount of binder material to be burned out. The reduction of the binder material to be burned out can, in turn, lead to decreased porosity of the final part as compared to methods in which the sintering aid is incorporated into the binder solution.

In various embodiments, the sintering aid comprises a fugitive metal precursor, nanoparticles (e.g., metallic or ceramic nanoparticles), or combinations thereof. The sintering aid, when provided in a sintering aid solution, may decompose at the lower temperatures of the debinding step and bond the particulate material prior to sintering of the particulate material, thereby providing strength to the brown body part. The strength provided by the fugitive metal precursor allows for the formation of fine features and/or the formation large parts. For example, for a part including a cantilevered portion, such as an overhang, weak brown strength may lead to the cantilevered portion collapsing or cracking because the weight of the cantilevered portion is not sustained by interparticle friction that keeps the printed part together prior to sintering. However, fugitive metal precursors may decompose during the debinding step enabling in-situ metal formation, which provides stiffness and strength to the printed part after substantially all of the thermoplastic binder is burned out by contacting and bridging the particulate material prior to sintering of the particulate material. Nanoparticles may aid in promoting a rapid, surface-based mass transfer between particles, forming interparticle necked regions much more rapidly than would be expected for particulate materials without nanoparticle additions, even at the relatively low temperatures typically used for debinding. Each of these mechanisms provides strength to the part after all the thermoplastic binder is burned out by contacting and bridging the particulate material prior to sintering of the particulate material, thereby improving the strength and stiffness of the printed part overall.

In embodiments, the sintering aid is a fugitive metal precursor is selected from the group consisting of an alkaline earth metal (i.e., an element from Group II of the periodic table), a transition metal (i.e., an element from Groups III-XII of the periodic table), a post-transition metal (i.e., aluminum, gallium, indium, tin, thallium, lead, and bismuth), a metalloid (i.e., boron, silicon, germanium, arsenic, antimony, and tellurium), a rare earth metal (i.e., scandium, yttrium, and lanthanides), and combinations thereof. In embodiments, the fugitive metal precursor is an organometallic compound that is organic solvent soluble, such as, by way of example and not limitation, ferrocene, cobaltocene, iron pentacarbonyl, or combinations thereof. In embodiments, the fugitive metal precursor is a salt, such as a compound selected from the group consisting of carboxylates, nitrates, sulfates, carbonates, formates, chlorides, halides, derivatives thereof, and combinations thereof. Examples of suitable salts that are water/organic solvent soluble include, but way of example and not limitation, nickel chloride, iron chloride, nickel formate, copper chloride, silver nitrate, nickel nitrate, copper nitrate, nickel carbonate, silver carbonate, silver perchlorate, silver halide, nickel sulfate, nickel sulfamate, nickel oxalate dehydrate, ammonium molybdate tetrahydrate, aluminum nitrate, magnesium chloride, barium nitrate, barium chloride, titanium nitrate, and combinations thereof. Other fugitive metal precursors are contemplated. In embodiments, the fugitive metal precursor is fully soluble in the solvent at STP.

In embodiments, the sintering aid solution includes greater than or equal to 0.5 wt % and less than or equal to 40 wt % of the fugitive metal precursor, based on a total weight of the sintering aid solution. In embodiments, the amount of the fugitive metal precursor in the sintering aid solution may be greater than or equal to 0.5 wt %, greater than or equal to 1 wt %, or even greater than or equal to 2 wt %. In embodiments, the amount of the fugitive metal precursor in the sintering aid solution may be less than or equal to 40 wt %, less than or equal 30 wt %, less than or equal to 25 wt %, less than or equal to 20 wt %, less than or equal to 15 wt %, less than or equal to 12 wt %, less than or equal to 10 wt %, less than or equal to 8 wt %, or even less than or equal to 6 wt %. For example, the amount of the fugitive metal precursor in the sintering aid solution may be greater than or equal to 0.5 wt % and less than or equal to 40 wt %, greater than or equal to 0.5 wt % and less than or equal to 30 wt %, greater than or equal to 0.5 wt % and less than or equal to 25 wt %, greater than or equal to 0.5 wt % and less than or equal to 20 wt %, greater than or equal to 0.5 wt % and less than or equal to 15 wt %, greater than or equal to 0.5 wt % and less than or equal to 12 wt %, greater than or equal to 0.5 wt % and less than or equal to 10 wt %, greater than or equal to 0.5 wt % and less than or equal to 8 wt %, greater than or equal to 0.5 wt % and less than or equal to 6 wt %, greater than or equal to 1 wt % and less than or equal to 40 wt %, greater than or equal to 1 wt % and less than or equal to 30 wt %, greater than or equal to 1 wt % and less than or equal to 25 wt %, greater than or equal to 1 wt % and less than or equal to 20 wt %, greater than or equal to 1 wt % and less than or equal to 15 wt %, greater than or equal to 1 wt % and less than or equal to 12 wt %, greater than or equal to 1 wt % and less than or equal to 10 wt %, greater than or equal to 1 wt % and less than or equal to 8 wt %, greater than or equal to 1 wt % and less than or equal to 6 wt %, greater than or equal to 2 wt % and less than or equal to 40 wt %, greater than or equal to 2 wt % and less than or equal to 30 wt %, greater than or equal to 2 wt % and less than or equal to 25 wt %, greater than or equal to 2 wt % and less than or equal to 20 wt %, greater than or equal to 2 wt % and less than or equal to 15 wt %, greater than or equal to 2 wt % and less than or equal to 12 wt %, greater than or equal to 2 wt % and less than or equal to 10 wt %, greater than or equal to 2 wt % and less than or equal to 8 wt %, or even greater than or equal to 2 wt % and less than or equal to 6 wt %, or any and all sub-ranges formed from any of these endpoints.

In embodiments, the sintering aid comprises nanoparticles in the form of metallic nanoparticles. In embodiments, the metallic nanoparticles comprise nickel (e.g., Ni-1170-30 (30 wt % Ni) (Applied Nanotech, Inc., Austin, Texas)), silver (e.g., MicroPE®PG-007-AP (60 wt % Ag) (Pam Technology, Suncheon-si, Jeollanam-do, Korea), chromium, aluminum, cobalt, iron, or combinations thereof. However, it should be understood that other metallic nanoparticles, such as titanium nanoparticles, copper nanoparticles, etc., are contemplated and possible. In embodiments, the metallic nanoparticle material depends on the particulate material. For example, nickel nanoparticles may be used with particulate material comprising stainless steel or nickel alloys.

In embodiments, the sintering aid comprises nanoparticles in the form of ceramic nanoparticles. In embodiments, the ceramic nanoparticles comprise alumina, aluminum nitride, zirconia, titania, silica, silicon nitride, silicon carbide, boron nitride, or combinations thereof. However, it should be understood that other ceramic nanoparticles are contemplated and possible. In embodiments, the ceramic nanoparticle material depends on the particulate material. For example, alumina nanoparticles may be used with particulate material comprising alumina or aluminum nitride.

In embodiments, the nanoparticles have an average diameter greater than or equal to 5 nm and less than or equal to 100 nm. In embodiments, the nanoparticles may have an average diameter greater than or even equal to 1 nm or greater than or equal to 5 nm. In embodiments, the nanoparticles may have an average diameter less than or equal to 100 nm. For example, the nanoparticles may have an average diameter greater than or equal to 1 nm and less than or equal to 100 nm, greater than or equal to 5 nm and less than or equal to 100 nm, greater than or equal to 10 nm and less than or equal to 100 nm, greater than or equal to 15 nm and less than or equal to 100 nm, or even greater than or equal to 20 nm and less than or equal to 100 nm, or any and all sub-ranges formed from any of these endpoints.

In embodiments, the nanoparticles have a sintering compaction temperature greater than or equal to 300° C. and less than or equal to 600° C. In embodiments, the nanoparticles may have a sintering compaction temperature less than or equal to 600° C., less than or equal to 550° C., less than or equal to 500° C., less than or equal to 450° C., less than or equal to 400° C., or even less than or equal to 350° C. For example, the nanoparticles may have a sintering compaction temperature greater than or equal to 300° C. and less than or equal to 600° C., greater than or equal to 350° C. and less than or equal to 600° C., greater than or equal to 400° C. and less than or equal to 600° C., greater than or equal to 450° C. and less than or equal to 600° C., greater than or equal to 500° C. and less than or equal to 600° C., greater than or equal to 500° C. and less than or equal to 600° C., greater than or equal to 300° C. and less than or equal to 550° C., greater than or equal to 300° C. and less than or equal to 500° C., greater than or equal to 300° C. and less than or equal to 450° C., greater than or equal to 300° C. and less than or equal to 400° C., greater than or equal to 300° C. and less than or equal to 350° C., greater than or equal to 350° C. and less than or equal to 550° C., or even greater than or equal to 400° C. and less than or equal to 500° C., or any and all sub-ranges formed from any of these endpoints.

In embodiments, the sintering aid solution comprises greater than or equal to 0.5 wt % and less than or equal to 20 wt % of the nanoparticles, based on a total weight of the sintering aid solution. In embodiments, the amount of nanoparticles in the sintering aid solution may be greater than or equal to 0.5 wt %, greater than or equal to 1 wt %, greater than or equal to 2 wt %, or even greater than or equal to 5 wt %. In embodiments, the amount of nanoparticles in the sintering aid solution may be less than or equal to 20 wt %, less than or equal to 15 wt %, less than or equal to 12 wt %, or even less than or equal to 10 wt %. For example, the amount of nanoparticles in the sintering aid solution may be greater than or equal to 0.5 wt % and less than or equal to 20 wt %, greater than or equal to 0.5 wt % and less than or equal to 17 wt %, greater than or equal to 0.5 wt % and less than or equal to 15 wt %, greater than or equal to 0.5 wt % and less than or equal to 12 wt %, greater than or equal to 0.5 wt % and less than or equal to 10 wt %, greater than or equal to 1 wt % and less than or equal to 20 wt %, greater than or equal to 1 wt % and less than or equal to 17 wt %, greater than or equal to 1 wt % and less than or equal to 15 wt %, greater than or equal to 1 wt % and less than or equal to 12 wt %, greater than or equal to 1 wt % and less than or equal to 10 wt %, greater than or equal to 2 wt % and less than or equal to 20 wt %, greater than or equal to 2 wt % and less than or equal to 17 wt %, greater than or equal to 2 wt % and less than or equal to 15 wt %, greater than or equal to 2 wt % and less than or equal to 12 wt %, greater than or equal to 2 wt % and less than or equal to 10 wt %, greater than or equal to 5 wt % and less than or equal to 20 wt %, greater than or equal to 5 wt % and less than or equal to 17 wt %, greater than or equal to 5 wt % and less than or equal to 15 wt %, greater than or equal to 5 wt % and less than or equal to 12 wt %, or even greater than or equal to 5 wt % and less than or equal to 10 wt %, or any and all sub-ranges formed from any of these endpoints.

According to various embodiments, the sintering aid is dissolved or suspended in a solvent, such as water or another flammable or non-flammable solvent. In embodiments, the solvent can be selected based at least in part on the material used in the powder layer and the sintering aid. For example, water can be selected as the solvent for use with ceramic and non-reactive metal materials, while flammable or non-flammable solvents can be selected for use with reactive metal materials. Flammable solvents suitable for use in the sintering aid solution can include, by way of example and not limitation, 2-methoxy ethanol, butanol, 1-methoxy propanol, 2-butoxy ethanol, ethylene glycol, ethylene glycol butyl ether, diethylene glycol, tetrahydrofuran (THF), methyl ethyl ketone (MEK), or combinations thereof. Organic (non-aqueous) solvents suitable for use in the sintering aid solution can include, by way of example and not limitation, dichloromethane (DCM), methoxy ethanol, toluene, ethoxy ethanol, mesitylene, or combinations thereof.

In various embodiments, the sintering aid solution is substantially free of polymers. For example, in embodiments, the sintering aid solution includes less than 1 wt %, less than 0.5 wt %, less than 0.25 wt %, less than 0.1 wt %, less than 0.01 wt % polymers, based on a total weight of the sintering aid solution. In embodiments, the sintering aid solution is free of (e.g., contains no) polymers. In embodiments, the sintering aid solution is substantially free of, or free of, thermoplastic polymers, thermosetting polymers, and monomers that can be polymerized to form thermoplastic or thermosetting polymers, including but not limited to the polymers and monomers described herein with respect to the binder solution. Accordingly, the sintering aid solution can be deposited on a layer of the powder at locations corresponding to locations within the thickness of the part (e.g., near the center of the part) without adding additional organic material that will need to be burned out during debinding. Thus, the use of the sintering aid solution at some locations of the layer of powder can provide sufficient brown strength while reducing the debinding time as compared to conventional binder jetting processes.

The sintering aid solution can be deposited in any suitable manner. For example, as described above with respect to method 400, in various embodiments, the sintering aid solution is deposited on a layer of the powder by a different print head (e.g., print head 58 in FIG. 3) than a print head used to deposit the binder solution (e.g., print head 38 in FIG. 3). As another example, in embodiments, the sintering aid solution is deposited on the layer of the powder by spraying the sintering aid solution on the layer, such as by using a sprayer. In embodiments, the sintering aid solution is deposited in a predetermined pattern on the layer, such as in place of the binder solution deposited in block 106 in FIG. 1. Accordingly, the sintering aid solution can be applied to all or some of the locations of the area of a layer of the part that do not receive the binder solution.

EXAMPLES

The following examples are provided to illustrate various embodiments, but are not intended to limit the scope of the claims. All parts and percentages are by weight unless otherwise indicated. Approximate properties, characters, parameters, etc., are provided below with respect to various working examples, comparative examples, and the materials used in the working and comparative examples.

Example 1

Figure 6:
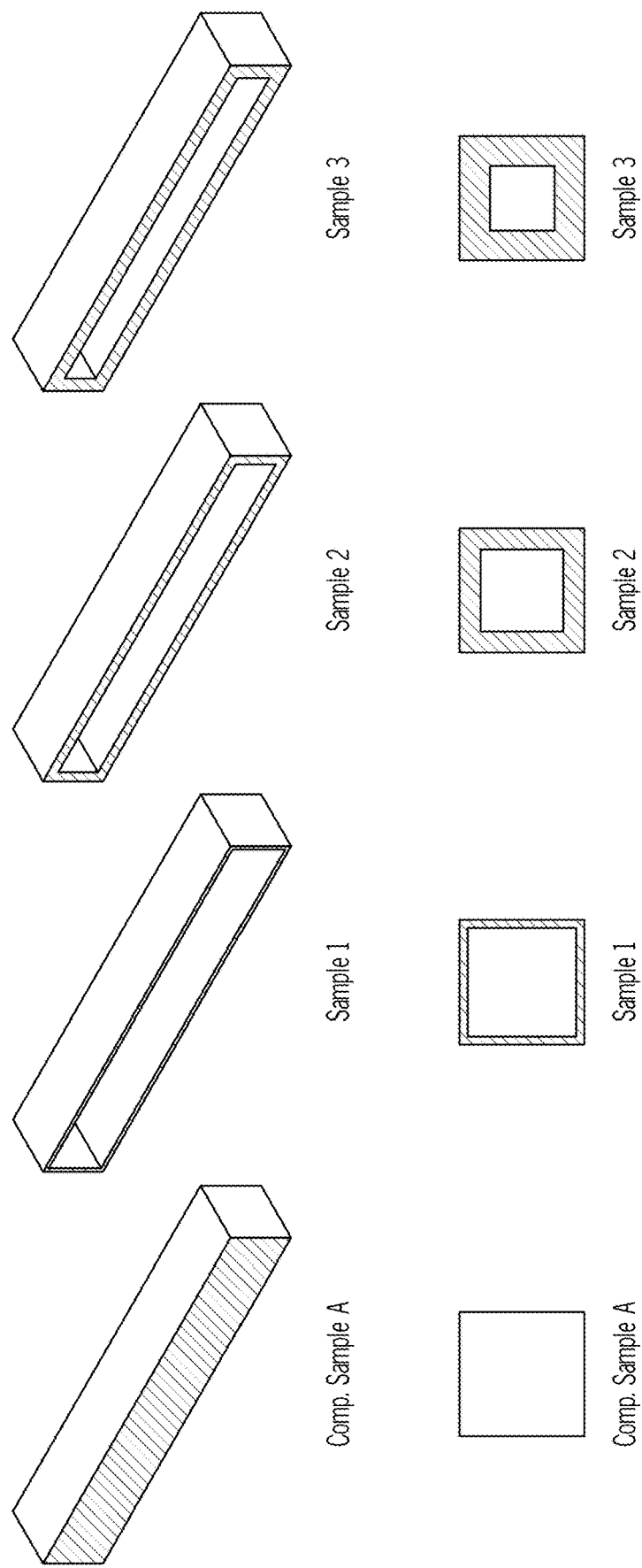
FIG. 6 schematically depicts cross-sectional views of the geometries of the bars of Comparative Sample A, Sample 1, Sample 2, and Sample 3.

Four separate geometries were printed, each having an external width of 15 mm, an external height of 15 mm, and an external length of 105 mm. Comparative Sample A was a set of solid printed bars, as shown in FIG. 6. Sample 1 was a set of bars having a shell printed region having a thickness of 1 mm, Sample 2 was a set of bars having a shell printed region having a thickness of 2.5 mm, and Sample 3 was a set of bars having a shell printed region having a thickness of 3.5 mm, as shown in FIG. 6. Each of Samples 1-3 included unbound powder within the shell printed region.

Each sample was printed in two different builds using SS316L powder and a binder comprising thermoplastic polymers in water based solvents. The bars of each sample set were then subjected to at three-point flexural strength test in accordance with ASTM B312-14 to measure the green strength of the bars. The results are shown in FIG. 7.

Figure 7:
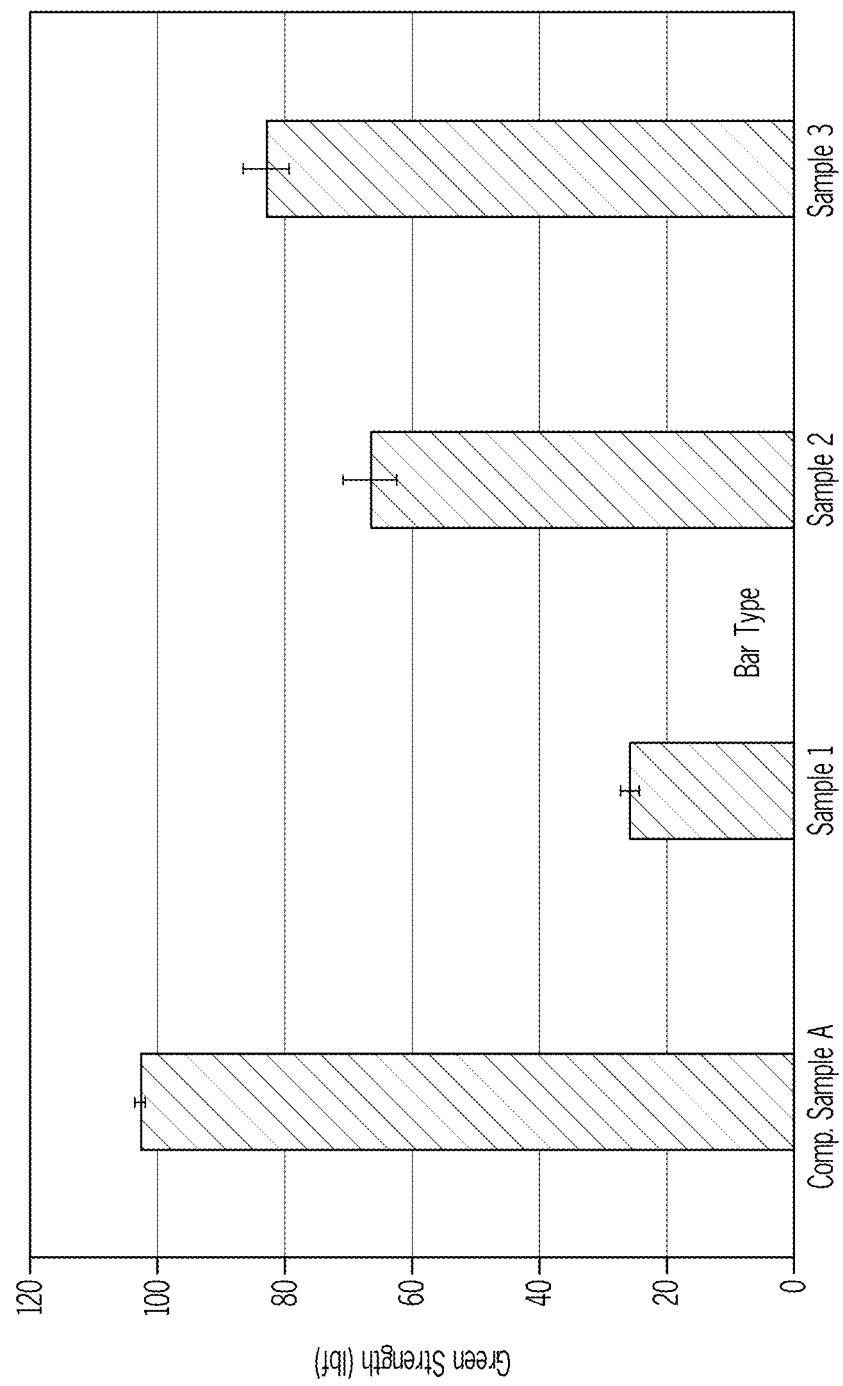
FIG. 7 is a graph showing the average green body strength (in lbf; Y-axis) for samples having the geometries depicted in FIG. 6.

As shown in FIG. 7, the samples containing unbound powder (Samples 1-3) have a reduction in green strength as compared to the solid printed bars of Comparative Sample A. In particular, Sample 1 exhibited a reduction of 75%, Sample 2 exhibited a reduction of 35%, and Sample 3 exhibited a reduction of 19%. Accordingly, the reduction in green strength was diminished with an increase in shell thickness. Moreover, Sample 3, which had a shell thickness of 3.5 mm exhibited a green strength that was within the error margin of the solid printed bars of Comparative Sample A. Without being bound by theory, it is believed that the trend in the green strength reduction will be true for all parts, although the actual values for the reduction may vary depending on the particular part.

Figure 8:
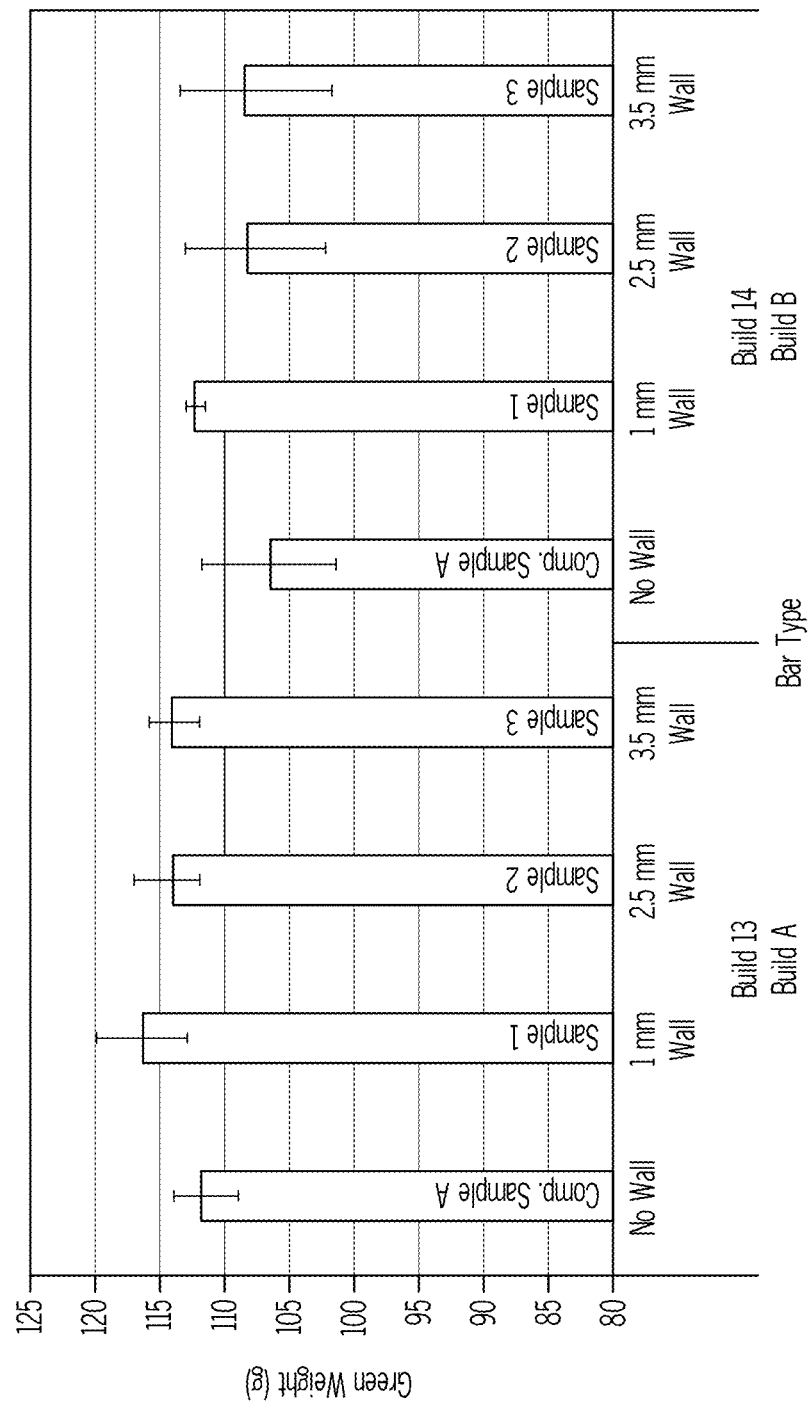
FIG. 8 is a graph showing the average green part weight (in g; Y-axis) for samples having the geometries depicted in FIG. 6 for two separate builds.

The green part weight was measured for the bars for both builds, and the average weight for each sample is shown in FIG. 8. As shown in FIG. 8, there was no significant difference in weight between the solid printed bars of Comparative Sample A and the bars having a shell (Samples 1-3). Accordingly, the density of the metal in the powdered state is equivalent for the solid bar and the shell bars, indicating that the weight of the binder is negligible.

Next, a subset of the bars from each sample set were sintered at 1395° C. for 6 hours under vacuum. Following sintering, visual inspection of the samples showed no obvious warpage or distortion of any of the bars. The sintered bars were weighed, and their weights were compared to their green part weight. For each of the sintered bars, the sintered weight was approximately 4.8% lower than the bar's corresponding green part weight. It is believed that the difference in green part weight and sintered weight can be attributed to weight loss resulting from the burning out of the binder, as well as any evaporation of alloying elements during the sintering process.

Additionally, the sintered bars were measured, and the measurements were compared to the measurements of the corresponding green body part. The sintered dimensions and expansion factors measured by a digital caliper are shown in Table 1 below.

TABLE 1

Shrinkage and Expansion Factors

| Sample | | Sintered Dimensions | | | Expansion Factors | | |
|---|---|---|---|---|---|---|---|
| | | x (mm) | y (mm) | z (mm) | x (mm) | y (mm) | z (mm) |
| Comp. Sample A | 1 | 88.37 | 12.92 | 12.43 | 1.188 | 1.161 | 1.207 |
| | 2 | 88.39 | 12.96 | 12.46 | 1.188 | 1.157 | 1.204 |
| | 3 | 88.58 | 13.05 | 12.52 | 1.185 | 1.149 | 1.198 |
| | 4 | 88.35 | 12.97 | 12.40 | 1.188 | 1.157 | 1.210 |
| Sample 1 | 1 | 88.96 | 12.76 | 12.56 | 1.180 | 1.176 | 1.194 |
| | 2 | 89.06 | 12.74 | 12.64 | 1.179 | 1.177 | 1.187 |
| Sample 2 | 1 | 88.81 | 12.71 | 12.51 | 1.182 | 1.180 | 1.199 |
| | 2 | 88.30 | 12.83 | 12.43 | 1.189 | 1.169 | 1.207 |
| Sample 3 | 1 | 88.46 | 12.91 | 12.35 | 1.187 | 1.162 | 1.215 |
| | 2 | 88.83 | 12.74 | 12.40 | 1.182 | 1.177 | 1.210 |

As shown in Table 1, all of the sintered bars demonstrated similar shrinkage and expansion factors.

Figure 9:
FIG. 9 are images from an optical microscope at 10× of a bar for geometry depicted in FIG. 6.
Figure 9:
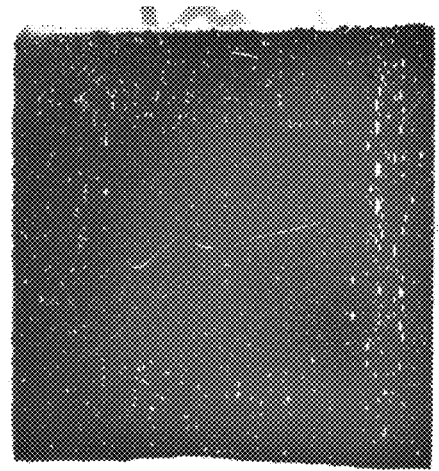
Figure 9:
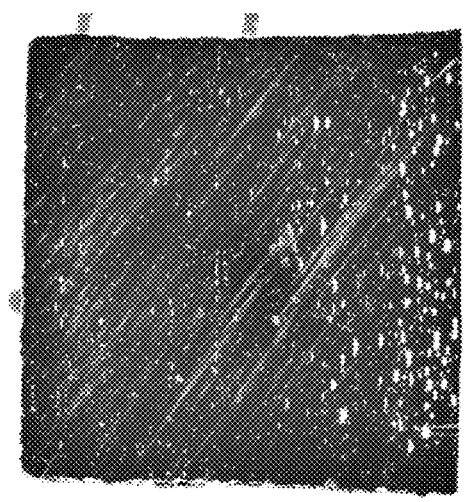
Figure 9:
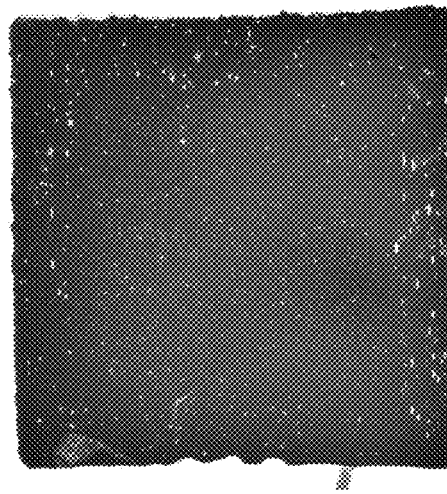

The sintered bars were then examined using 10× optical microscopy. A representative image for each sample set is provided in FIG. 9. As shown in FIG. 9, Comparative Sample A exhibits a slight taper along the vertical all and has a high distribution of porosity, particularly in the lower region of the bar. In contrast, Sample 1 exhibited minimal porosity and no taper of the vertical wall. Samples 2 and 3 exhibited porosity in the binder-deposited region corresponding to the shell. Accordingly, reduced porosity and warpage can be realized by reducing the amount of binder deposited to an interior of the part without significantly impacting the weight loss or expansion factor of the part.

Finally, the 0.2% yield strength and the ultimate tensile strength were measured at 75° F. and at 800° F. for sintered bars from Comparative Sample A and Sample 1. Some of the sintered bars from Comparative Sample A were subjected to hot isostatic pressing to reduce the porosity before measurement (indicated by "HIP" in FIGS. 10A-D). The 0.2% yield strength and the ultimate tensile strength was measured in accordance with ASTM E8 (RT) and ASTM E21 (ET). The results are shown in FIGS. 10A-10D.

Figure 10A:
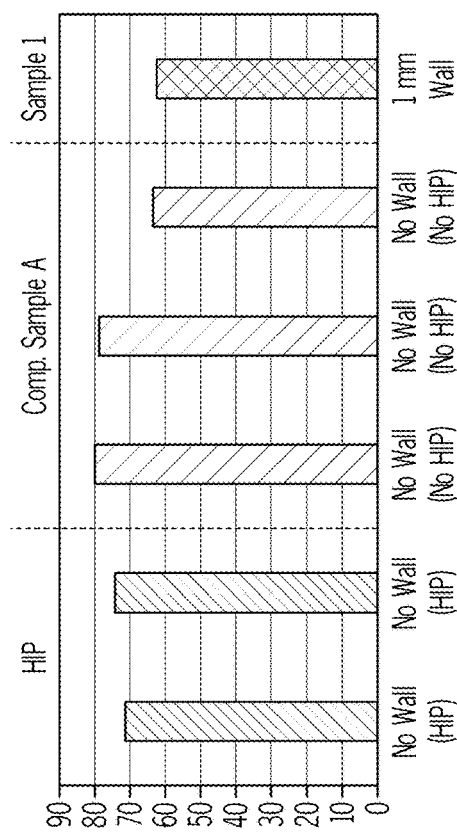
FIG. 10A is a graph showing the 0.2% yield strength at room temperature for sintered parts having the geometries of Comparative Sample A and Sample 1.
Figure 10B:
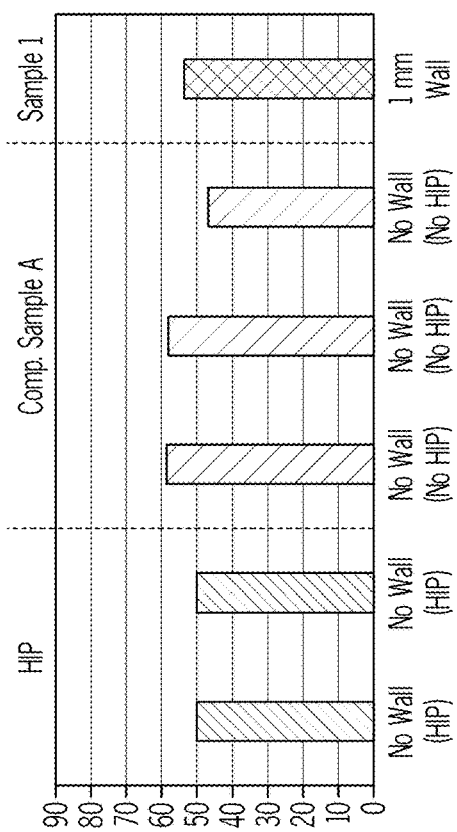
FIG. 10B is a graph showing the ultimate strength at room temperature for sintered parts having the geometries of Comparative Sample A and Sample 1.
Figure 10C:
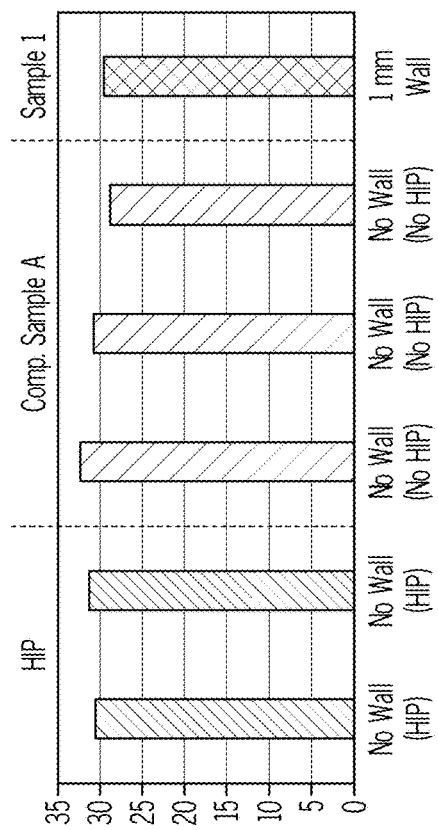
FIG. 10C is a graph showing the 0.2% yield strength at 800° F. for sintered parts having the geometries of Comparative Sample A and Sample 1.
Figure 10D:
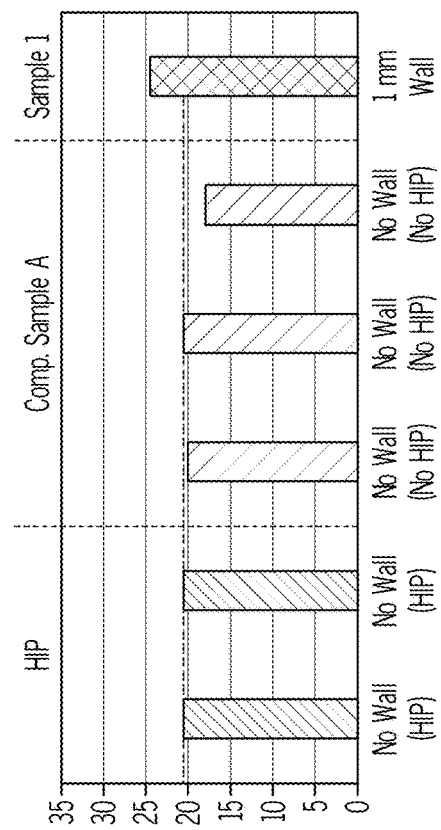
FIG. 10D is a graph showing the ultimate strength at 800° F. for sintered parts having the geometries of Comparative Sample A and Sample 1.

As shown in FIGS. 10A and 10B, which show the 0.2% yield strength and ultimate tensile strength, respectively, at room temperature, there was no significant benefit to printing the shell as compared to a solid bar related to the tensile strength at room temperature. However, as shown in FIG. 10C, at 800° F., the 0.2% yield strength was 25% higher. FIG. 10D shows that the ultimate strength, even at 800° F., remains unaffected. Accordingly, a significant improvement in the yield strength can be realized by using the methods described herein.

Accordingly, various embodiments described herein provide methods in which a binder solution is deposited on a powder layer at locations corresponding to an edge boundary of a final part, but less than all locations at which powder is sintered to form the final part. Depending on the particular embodiment, a sintering aid solution may be deposited on the powder layer, or the powder may remain unbound but contained within a geometry of the part defined by the edge boundary. Thus, a reduced amount of binder is deposited within the powder bed as compared to conventional processes, which can lead to decreased debinding times, increased throughput, and decreased porosity. Moreover, in various embodiments, the binder solution and sintering aid solution described herein can be employed to achieve these advantages while also maintaining sufficient green and/or brown strength of the part.

Further aspects of the invention are provided by the subject matter of the following clauses:

1. A method of additively manufacturing a part comprising: depositing a layer of a powder on a working surface; depositing a binder solution on the layer of the powder at first locations, wherein the binder solution comprises: greater than or equal to 93 wt % and less than or equal to 99.8 wt % of a monomer; greater than or equal to 0.1 wt % and less than or equal to 2 wt % of a thermal initiator; and greater than or equal to 0.1 wt % and less than or equal to 3 wt % of at least one of a super acid generating initiator, a photo-thermal initiator, and a photoinitiator; and depositing a sintering aid solution on the layer of the powder at second locations, wherein the sintering aid solution comprises a sintering aid in a solvent.

2. The method of any preceding clause, wherein the sintering aid comprises a fugitive metal precursor, metallic nanoparticles, ceramic nanoparticles, or combinations thereof.

3. The method of any preceding clause, wherein the sintering aid solution is substantially free of polymers.

4. The method of any preceding clause, wherein the binder solution is deposited with a first print head and the sintering aid solution is deposited with a second print head.

5. The method of any preceding clause, wherein the first locations correspond to a surface of the part.

6. The method of any preceding clause, wherein the second locations correspond to a thickness of the part between surfaces of the part.

7. The method of any preceding clause, wherein depositing the sintering aid solution on the layer comprises selectively depositing the sintering aid solution in a predetermined pattern on the layer.

8. The method of any preceding clause, wherein depositing the sintering aid solution comprises spraying the sintering aid solution on the layer.

9. The method of any preceding clause, further comprising: polymerizing the binder solution to form a green body part having a flexural strength greater of greater than or equal to 15 MPa; and heat treating the green body part to remove the binder to form a brown body part having a brown strength of greater than 1-3 MPa.

10. The method of any preceding clause, wherein the green body part has a flexural strength greater of greater than or equal to 20 MPa.

11. A method of additively manufacturing a part comprises: for each of a plurality of regions of the part, determining a thickness of the part within the region, wherein the thickness of the part within each region comprises a solid wall devoid of cavities between a first surface of the region and a second surface of the region, and the thickness is a distance between the first surface and the second surface; depositing the binder solution within a powder bed at locations corresponding to the first surface and the second surface of each of the plurality of regions to bind powder along each of the first surface and the second surface, thereby defining a geometry of the part; for at least one of the plurality of regions of the part, depositing the binder solution within the powder bed in a predetermined pattern at locations between the first surface and the second surface such that at least some powder between the first surface and the second surface is unbound; removing loose powder external to the geometry of the part, thereby exposing a green body part having unbound powder contained within the geometry of the part; and sintering the green body part to generate the part, wherein the unbound powder contained in the green body part is sintered to solidify the solid wall of the part.

12. The method of any preceding clause, wherein the depositing the binder solution at locations corresponding to the first surface and the second surface of each of the plurality of regions comprises depositing the binder solution at locations effective to bind a layer having a thickness of from 2.5 mm to 4.0 mm for each of the first surface and the second surface of each of the plurality of regions.

13. The method of any preceding clause, wherein the predetermined pattern is selected based on processes to which the green body part will be subjected, handling to which the green body part will be subjected, loads to which the green body part will be subjected, or combinations thereof.

14. The method of any preceding clause, wherein, for at least one of the plurality of regions of the part, no binder solution is deposited at locations between the first surface and the second surface such that the powder between the first surface and the second surface is unbound.

15. The method of any preceding clause, wherein for at least one of the plurality of regions of the part, depositing the binder solution within the powder bed between the first surface and the second surface to bind powder between the first surface and the second surface such that substantially all of the powder between the first surface and the second surface is bound within the at least one of the plurality of regions.

16. The method of any preceding clause, wherein the predetermined pattern comprises treads extending between the first surface and the second surface.

17. The method of any preceding clause, wherein an amount of binder present at a surface of the green body part is greater than an amount of binder present within a thickness of a wall of the green body part.

18. The method of any preceding clause, further comprising: curing the green body part, wherein a time to cure the green body part is less than a time to cure a comparative green body part having a geometry identical to the green body part and in which all powder within the geometry of the part is bound.

It will be apparent to those skilled in the art that various modifications and variations can be made to embodiment of the present disclosure without departing from the spirit and scope of the disclosure. Thus, it is intended that the present disclosure cover such modifications and variations provided they come within the scope of the appended claims and their equivalents.

What is claimed is:

1. A method of additively manufacturing a part, the method comprising:
    depositing a layer of a powder on a working surface;
    depositing a binder on the layer of the powder at first locations, wherein the binder comprises, based on a total weight of the binder:
        greater than or equal to 93 wt % and less than or equal to 99.8 wt % of a monomer;
        greater than or equal to 0.1 wt % and less than or equal to 2 wt % of a thermal initiator; and
        greater than or equal to 0.1 wt % and less than or equal to 3 wt % of at least one of a super acid generating initiator, a photo-thermal initiator, and a photoinitiator; and
    depositing a sintering aid solution on the layer of the powder at second locations, wherein the sintering aid solution comprises a sintering aid in a solvent.

2. The method of additively manufacturing a part of claim 1, wherein the sintering aid comprises a fugitive metal precursor, metallic nanoparticles, ceramic nanoparticles, or combinations thereof.

3. The method of additively manufacturing a part of claim 1, wherein the sintering aid solution is free of polymers.

4. The method of additively manufacturing a part of claim 1, wherein the binder is deposited with a first print head and the sintering aid solution is deposited with a second print head.

5. The method of additively manufacturing a part of claim 1, wherein the first locations correspond to a surface of the part.

6. The method of additively manufacturing a part of claim 1, wherein the second locations correspond to a thickness of the part between surfaces of the part.

7. The method of additively manufacturing a part of claim 1, wherein depositing the sintering aid solution on the layer comprises selectively depositing the sintering aid solution in a predetermined pattern on the layer.

8. The method of additively manufacturing a part of claim 1, wherein depositing the sintering aid solution comprises spraying the sintering aid solution on the layer.

9. The method of additively manufacturing a part of claim 1, further comprising:
    polymerizing the binder to form a green body part having a green body strength greater than or equal to 15 MPa, as measured in accordance with ASTM B312-14; and
    heat treating the green body part to remove the binder to form a brown body part having a brown body strength of greater than 1-3 MPa, as measured in accordance with ASTM B312-14.

10. The method of additively manufacturing a part of claim 9, wherein the green body part has a green body strength greater than or equal to 20 MPa, as measured in accordance with ASTM B312-14.

11. A method of additively manufacturing a part, the method comprising:
    for each of a plurality of regions of the part, determining a thickness of the part within the region, wherein the thickness of the part within each region comprises a solid wall devoid of cavities between a first surface of the region and a second surface of the region, and the thickness is a distance between the first surface and the second surface;
    depositing the binder solution within a powder bed at locations corresponding to the first surface and the second surface of each of the plurality of regions to bind powder along each of the first surface and the second surface, thereby defining a geometry of the part;
    for at least one of the plurality of regions of the part, depositing the binder solution within the powder bed in a predetermined pattern at locations between the first surface and the second surface such that at least some powder between the first surface and the second surface is unbound;
    removing loose powder external to the geometry of the part, thereby exposing a green body part having unbound powder contained within the geometry of the part; and
    sintering the green body part to generate the part, wherein the unbound powder contained in the green body part is sintered to solidify the solid wall of the part.

12. The method of claim 11, wherein the depositing the binder solution at locations corresponding to the first surface and the second surface of each of the plurality of regions comprises depositing the binder solution at locations effective to bind a layer having a thickness of from 2.5 mm to 4.0 mm for each of the first surface and the second surface of each of the plurality of regions.

13. The method of claim 11, wherein the predetermined pattern is selected based on processes to which the green body part will be subjected, handling to which the green body part will be subjected, loads to which the green body part will be subjected, or combinations thereof.

14. The method of claim 11, wherein, for at least one of the plurality of regions of the part, no binder solution is deposited at locations between the first surface and the second surface such that the powder between the first surface and the second surface is unbound.

15. The method of claim 11, wherein for at least one of the plurality of regions of the part, depositing the binder solution within the powder bed between the first surface and the second surface to bind powder between the first surface and the second surface such that substantially all of the powder between the first surface and the second surface is bound within the at least one of the plurality of regions.

16. The method of claim 11, wherein the predetermined pattern comprises treads extending between the first surface and the second surface.

17. The method of claim 11, wherein an amount of binder present at a surface of the green body part is greater than an amount of binder present within a thickness of a wall of the green body part.

18. The method of claim 11, further comprising:
curing the green body part, wherein a time to cure the green body part is less than a time to cure a comparative green body part having a geometry identical to the green body part and in which all powder within the geometry of the part is bound.

* * * * *